(12) United States Patent  
Matos

(10) Patent No.: US 8,289,172 B2  
(45) Date of Patent: *Oct. 16, 2012

(54) METHOD AND SYSTEM OF AIRCRAFT PILOT ASSESSMENT AND FOR REMEDIAL ACTION UPON PILOT IMPAIRMENT

(76) Inventor: Jeffrey A. Matos, New Rochelle, NY (US)

( * ) Notice: Subject to any disclaimer, the term of this patent is extended or adjusted under 35 U.S.C. 154(b) by 1464 days.

This patent is subject to a terminal disclaimer.

(21) Appl. No.: 11/805,268

(22) Filed: May 22, 2007

(65) Prior Publication Data

US 2008/0122636 A1     May 29, 2008

Related U.S. Application Data

(63) Continuation-in-part of application No. 11/388,311, filed on Mar. 24, 2006, now Pat. No. 8,164,464.

(60) Provisional application No. 60/664,997, filed on Mar. 24, 2005.

(51) Int. Cl.
*G08B 23/00* (2006.01)

(52) U.S. Cl. ............................................ 340/576; 701/3

(58) Field of Classification Search .................. 340/576, 340/439; 701/3–18; 434/29–59

See application file for complete search history.

(56) References Cited

U.S. PATENT DOCUMENTS

| | | | | |
|---|---|---|---|---|
| 4,775,116 A | * | 10/1988 | Klein | 244/76 R |
| 4,821,982 A | * | 4/1989 | Van Patten | 701/3 |
| 5,574,641 A | * | 11/1996 | Kawakami et al. | 340/576 |
| 6,487,500 B2 | * | 11/2002 | Lemelson et al. | 701/301 |
| 6,575,902 B1 | * | 6/2003 | Burton | 340/575 |
| 6,734,799 B2 | * | 5/2004 | Munch | 340/576 |
| 6,810,310 B1 | * | 10/2004 | McBain | 701/3 |
| 6,845,302 B2 | * | 1/2005 | Moretto | 701/3 |
| 6,946,966 B2 | * | 9/2005 | Koenig | 340/576 |
| 7,027,621 B1 | * | 4/2006 | Prokoski | 340/576 |

* cited by examiner

*Primary Examiner* — Thomas Mullen

(74) *Attorney, Agent, or Firm* — Eckert Seamans Cherin & Mellott, LLC

(57) ABSTRACT

A method and system are disclosed for assessing the capability of a first person to operate a machine, such as an aircraft or other transport vehicle. The method includes the steps of:

(a) Sensing the value of at least one, and preferably two or more information parameters for assessing the fitness of the person operating the machine. The parameters include one or a combination of electroencephalogram information, electrocardiogram information, heart rate information, respiratory rate information, eye motion information, eyelid position information, eyelid motion information, expired gas mixture information, blood oxygen content information, blood oxygen saturation information and blood pressure information for the person operating the machine, and/or information about operation of the machine as well as information about actions taken by the person operating the machine.

(b) Determining whether at least one value of one information parameter is/are not within the range of values deemed to be acceptable for a capable person.

(c) Indicating when the at least one information parameter is/are not within the range of acceptable values, thereby indicating the person's decreased fitness and ability to operate the machine.

20 Claims, 16 Drawing Sheets

METHOD AND SYSTEM OF AIRCRAFT PILOT ASSESSMENT AND FOR REMEDIAL ACTION UPON PILOT IMPAIRMENT

CROSS-REFERENCE TO RELATED PATENTS AND APPLICATIONS

This application is a continuation-in-part of application Ser. No. 11/388,311, filed Mar. 24, 2006 (now U.S. Pat. No. 8,164,464, issued Apr. 24, 2012) and entitled "METHOD AND SYSTEM OF AIRCRAFT PILOT ASSESSMENT", which application was published on Oct. 5, 2006 under the Publication No. US2006/0220883.

The subject matter of this application is related to that disclosed in the U.S. Pat. No. 6,917,863, issued Jul. 12, 2005 and entitled "SYSTEM FOR ASSUMING AND MAINTAINING SECURE REMOTE CONTROL OF AN AIRCRAFT", which patent is incorporated herein by reference. The subject matter of this application is also related to that of the U.S. patent application Ser. No. 10/919,169, filed Aug. 16, 2004, (now U.S. Pat. No. 7,840,317, issued Nov. 23, 2010) and entitled "METHOD AND SYSTEM FOR CONTROLLING A HIJACKED AIRCRAFT". This application was published on Feb. 16, 2006 under the Publication No. US2006/0032978, which publication is also incorporated herein by reference. Further, the subject matter of this application is related to that of the U.S. patent application Ser. No. 11/373,712 filed Mar. 10, 2006, (now U.S. Pat. No. 7,837, 143, issued Nov. 23, 2010 and entitled "METHOD AND APPARATUS FOR DISABLING PILOT CONTROL OF A HIJACKED AIRCRAFT". This application was published on Nov. 9, 2006 under the Publication No. US2006/0249625, which publication is also incorporated herein by reference.

This application claims priority from U.S. Provisional Application No. 60/664,997, filed Mar. 24, 2005, as well as the U.S. patent application Ser. No. 11/388,311, filed Mar. 24, 2006.

BACKGROUND OF THE INVENTION

The present invention relates to apparatus for assuming and maintaining secure control of an aircraft in the event of an emergency condition, such as any incapacity of the pilot(s) or an intended, attempted or actual attack upon the pilot(s) of the aircraft, or upon the aircraft itself.

There are many situations in which an emergency condition may exist on-board an aircraft. For example, the pilot or pilots may be incapacitated due to a sudden loss of cabin pressure, a sudden illness, an intentional biological, chemical or physical attack upon the pilot, a collision, a fire, an explosion or even a missile attack.

In the event of an emergency condition of the type described above, wherein the pilot is unable to properly maintain control the aircraft, the aircraft, crew and passengers can be saved if the aircraft is brought down to a safe landing, guided by some alternate source of aircraft control. The U.S. Pat. No. 6,917,863 discloses a method and system for assuming and maintaining secure remote control of an aircraft in the event of an actual or potential aircraft hijacking or other emergency condition such as incapacity of the pilot(s) due to illness or injury. The U.S. Patent Publication No. US2006/0032978 discloses a number of scenarios which, in the event of a hijacking or other incapacity of the pilot(s), entail an early autopilot/flight control computer control phase, followed by a later remote pilot control phase, whereby personnel on the ground or in another aircraft can assist in bringing the aircraft down for a safe landing at a desired location. The U.S. patent application Ser. No. 11/373,712 discloses and claims a method and system for disabling on-board pilot control of a non-fly-by-wire aircraft in the event of an emergency condition.

The present invention relates to methods and systems for determining whether an emergency condition due to operator incapacity exists on-board an aircraft, or some other type of machine. More particularly, the invention concerns a method and system for "pilot assessment": an assessment to determine the moment-to-moment fitness of an aircraft pilot. If the pilot is found to be unfit or unable to control the aircraft, control of the aircraft may be taken away from the pilot.

The present invention is applicable not only to aircraft but also to any situation where a person is responsible for operating a machine, especially where incapacity of the person to operate the machine may result in personal injury or damage to property. In preferred embodiments of the invention, the machine may be any type of transport vehicle, such as an automobile, truck, tank, unmanned ground vehicle, train, watercraft (manned or remotely controlled) or an unmanned aerial vehicle ("UAV") or system, in addition to a conventional aircraft with an onboard pilot. The "machine" may also be a control system, such as the Air Traffic Control System, which controls or results in controlling other persons or systems that may cause death or injury, or damage to property, if not operated properly.

SUMMARY OF THE INVENTION

A principal object of the present invention is to provide a highly reliable method and system for assessing the capability of a person to operate a machine, such as an aircraft or other transport vehicle.

This object, as well as other objects which will become apparent from the discussion that follows, are achieved, in accordance with the present invention, by providing a method and means for:

(a) Sensing the value of at least one information parameter for assessing the fitness of the person operating the machine. The parameters include (i) one or a combination of: electroencephalogram (EEG) information, electrocardiogram (ECG) information, heart rate information, respiratory rate information, eye motion information, eyelid position information, eyelid motion information, expired gas mixture information, blood oxygen content information, blood oxygen saturation information and blood pressure information for the person operating the machine and/or (ii) information about actions taken by the person operating the machine ($\alpha$) in response to machine conditions which require the attention or intervention of the person, and/or ($\beta$) in response to prompts by the machine intended to assess operator attention and/or competence;

(b) Determining whether the value of the information parameter(s) is/are within, or not within, the range of values that are deemed to be acceptable for operating the machine;

(c) Indicating when the information parameter(s) is/are not within the range of acceptable values, thereby indicating the person's decreased fitness and ability to operate the machine; and (d) In response to this indication, possibly transferring control of the machine to a source of control other than the operator deemed to be performing sub-optimally.

In order to increase the level of certainty that the person operating the machine is or is not fully capable of doing so, it is preferable that two or more of the information parameters noted above be sensed and analyzed. In particular, it is preferable that at least one of (i) information about the operation of the machine and (ii) information about the actions of the first person be sensed and analyzed as well as at least one of the other information parameters; that is, one of the physiologic information parameters.

In the case of an aircraft, as discussed in the aforementioned patent and patent applications, the other source of control may be any one or more of (a) one or more autopilot(s), (b) one or more flight control computer(s), and/or (c) a remote pilot. Hereinbelow, the aforementioned choices (a) through (c) will be referred to as "alternate source of control." Furthermore, the alternate source of control, in the case of a machine other than an aircraft, is intended to refer to any (a) equipment, or (b) person, able to operate the machine in the event that the originally intended operator is impaired.

Hereinbelow, (a) "pilot" is intended to refer to the operator of any machine where improper machine operation may result in personal injury or property damage; (b) "aircraft" is intended to refer to any machine where improper machine operation may result in personal injury or property damage, (c) "off-aircraft" is intended to refer to any location containing a remote pilot, and may also include equipment or personnel capable of assessing pilot competence; "on-board" is intended to refer to locations within, attached to, or in the immediate vicinity of the aircraft, the aircraft defined hereinabove; (d) "emergency" and "emergency condition" are intended to refer to any condition in which the operator of any machine is performing at a sub-optimal level, such that machine operation may result in personal injury or property damage; and (e) "impaired pilot" is intended to indicate a machine operator who is performing at a sub-optimal level, such that machine operation may result in personal injury or property damage.

In one preferred embodiment of the invention, pilot incapacity results in a pilot-initiated takeover, hereinafter called "PITO" (as discussed in U.S. Pat. No. 6,917,863, U.S. patent application Ser. No. 10/919,169, and U.S. patent application Ser. No. 11/373,712), wherein the state of emergency is declared either by the pilot himself, or by other personnel or equipment on-board the aircraft. This results in removal of aircraft control from the on-board pilot and transfer of aircraft control to the alternate source of control. The aforementioned removal and transfer may be reversible or irreversible. In this embodiment, once the criteria for pilot incapacity have been satisfied, aircraft control is automatically transferred to the alternate source of control by equipment on-board the aircraft.

In another preferred embodiment of the invention, pilot incapacity may result in a remote-initiated takeover, hereinafter called "RITO" (as discussed in U.S. Pat. No. 6,917,863, U.S. patent application Ser. No. 10/919,169, and U.S. patent application Ser. No. 11/373,712), wherein the state of emergency is declared by off-aircraft personnel or equipment. In this embodiment, information about pilot performance is transmitted to an off-aircraft location, where equipment or personnel capable of assessing pilot performance is/are located. The equipment and/or personnel, if deemed appropriate, may issue a signal which causes removal of aircraft control from the on-board pilot and transfer of aircraft control to the alternate source of control. The aforementioned removal and transfer may be reversible or irreversible.

In yet another preferred embodiment of the invention, on-board pilot assessment equipment may define three or more levels of pilot competence. In this embodiment, these levels are:

(a) a high level of on-board pilot competence, wherein the on-board pilot continues to control the aircraft;

(b) an intermediate level of on-board pilot competence, wherein continued on-board pilot control (with or without an increased level of pilot surveillance) may be permitted, or the alternate source of control may be allowed to take control of the aircraft; and (c) a low level of on-board pilot competence, wherein the alternate source of control is always caused to take control of the aircraft.

The invention would be especially useful on-board an aircraft which contains only one pilot. One such class of aircraft would be military aircraft. Other classes of solo-pilot aircraft include so-called private aircraft used for personal purposes, and commercial aircraft such as corporate jet aircraft and cargo—e.g. mail-carrying aircraft.

The system could be used on any one-pilot aircraft. Furthermore, this system and methodology could be used on aircraft with more than one pilot, by having a duplicate assessment system, one for each pilot.

For a full understanding of the present invention, reference should now be made to the following detailed description of the preferred embodiments of the invention as illustrated in the accompanying drawings.

BRIEF DESCRIPTION OF THE DRAWINGS

FIG. 16 is a flow diagram showing method of adjusting the post second TO management to the severity of the conditions which follow the second TO.

DESCRIPTION OF THE PREFERRED EMBODIMENTS

Figure 1:
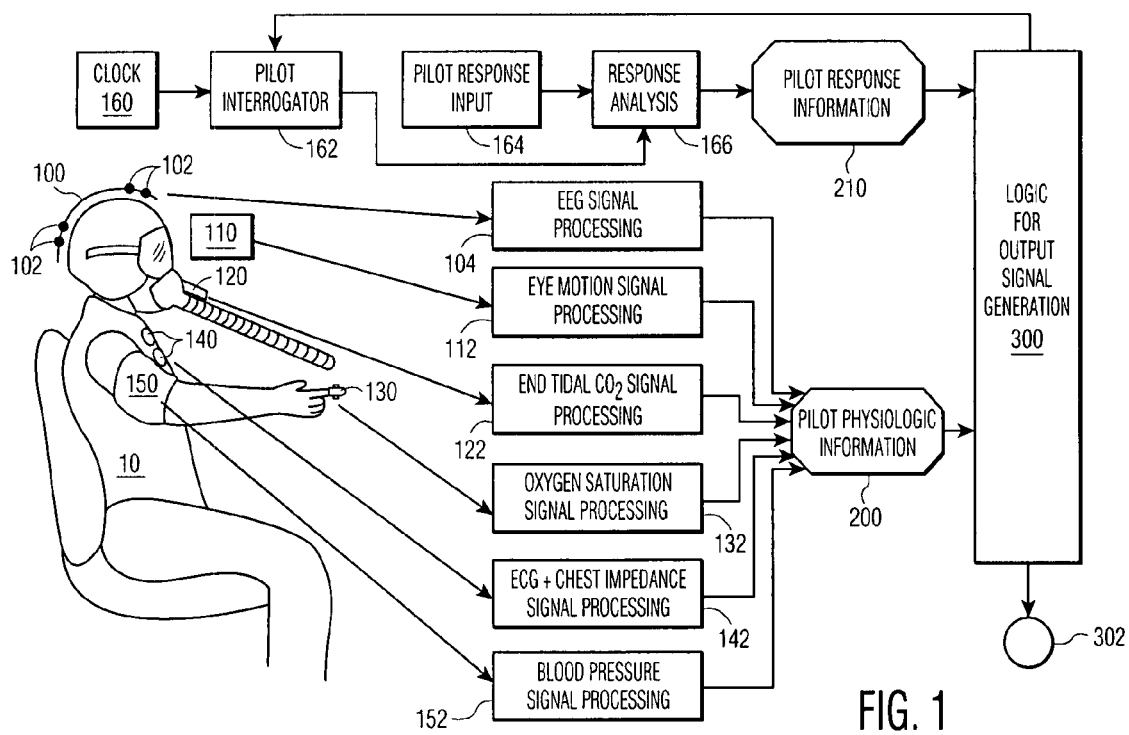
FIG. 1 is a block diagram showing a machine operator (an aircraft pilot) having a plurality of sensors and a pilot interrogator, each connected to an associated signal processor for assessing pilot performance in accordance with the present invention.

Index
1. Aircraft Pilot Assessment; Transfer of Control in the Event of Impaired Pilot (FIGS. 1 and 2)
2. Allowing the Return of Control (ROC) to the Impaired Pilot if Certain Conditions are Met (FIGS. 3-16)
   2.1—General concepts
   2.2—Hysteresis prior to ROC
   2.3—Probation post ROC
   2.4—ROC following second TO
3. Impaired Pilot Concepts with Regard to UAVs, and other unmanned vehicles The preferred embodiments of the present invention will now be described with reference to FIGS. 1-16 of the drawings. Identical elements in the various figures are identified with the same reference numerals.

1. Aircraft Pilot Assessment

If the pilot assessment system, according to the invention, determines that the pilot is, at that moment, not fit to fly, control may be taken from him in one of two ways:
(a) The takeover process may occur on-board the aircraft. The output 302 (see FIG. 1) of the assessment system may be used as a PITO input.
(b) The output(s) of the assessment system may be transmitted to an off-aircraft person (or electronic/computational system) who (which), then makes the decision about appropriateness of a takeover command. If takeover is appropriate, a RITO command is sent to the aircraft.

Logic unit 300 is supplied with pilot fitness information, which is processed therein to assess pilot capacity to fly the aircraft. There are three types of input to 300:
(a) pilot physiologic information (200);
(b) pilot responses to actionable events (210 and 212); and
(c) aircraft information (220, 222 and 224) which may be used to assess pilot performance.

Referring to FIG. 1, six types of pilot information may be collected from sensors attached to or in proximity to pilot 10:
(a) Helmet 100 with electroencephalogram (EEG) electrodes 102 allows monitoring of the pilot's EEG as a means of assessing his state of consciousness. The electrode signals are processed at 104 by means known in the art. Such processing may include digitization, amplification, frequency and spectral analysis. The output of 104 is included in the pilot physiologic information package 200.
(b) Pilot eye motion and eyelid opening is assessed, also as a means of assessing the pilot's state of alertness. Optical scanning equipment 110, as is known in the art, generates eye and/or eyelid information, 110 output signals are processed at 112, and included in the pilot physiologic information package 200.
(c) End-tidal-carbon dioxide is assessed from the pilot's expired gas mixture by sensor 120, as is known in the art. Sensor 120 signals are processed at 122, and included in the pilot physiologic information package 200.
(d) Blood oxygen saturation is assessed by sensor 130. As shown in the Figure it is attached to one finger but may, as is known in the art, be attached to locations elsewhere on the pilot's body, including the ear. Sensor 130 signals are processed at 132, and included in the pilot physiologic information package 200.
(e) Electrocardiogram (ECG) information is obtained from ECG electrodes 140. As shown in the Figure, 140 are attached to the chest but may, as is known in the art, be attached to one or more arm and/or one or more leg and/or one or more torso locations. Sensors 140 may also be used to monitor pilot respiration, by measuring transthoracic impedance. Sensors 140 signals are processed at 142 and included in the pilot physiologic information package 200. In addition, information derived from the ECG, e.g. heart rate and heart rate variability may be obtained by 142, and included in the pilot physiologic information package 200.
(f) Blood pressure is assessed by sensor 150. As shown in the Figure it is attached to one arm but may, as is known in the art, be attached to locations elsewhere on the pilot's body. Sensor 150 signals are processed at 152, and included in the pilot physiologic information package 200.

The combined outputs of 104, 112, 122, 132, 142 and 152 constitute the pilot physiologic information 200, which serves as an input to logic unit 300. Embodiments of the invention which sense a smaller number of the aforementioned physiologic parameters are possible. Embodiments of the invention which sense additional physiologic parameters (e.g. galvanic skin resistance, respiratory volume, etc.) are also possible.

Typical pilot responses to actionable events include:
(i) responses to a prompt (hereinafter referred to as "responses of the first type") whose sole purpose is to assess pilot responsiveness; and
(ii) responses to an indicator light, sound, screen message, or other pilot warning (hereinafter referred to as "responses of the second type") indicating an aircraft or system condition, parameter or fault which may potentially require pilot action.

Elements 160, 162, 164 and 166 show a means of assessing pilot responses of the first type. Clock 160 periodically generates a prompt which is presented to the pilot by interrogator 162. Element 162 may be a flashing light, a sound producing device, a screen on which a message is displayed and/or a device which produces a tactile sensation for the pilot. The pilot is expected to input a response to this prompt. Element 164, the input device for the pilot response, may be a keyboard, a touch sensitive screen, a sound/voice detecting system, a button or switch, or any other input device which registers a pilot response. The expected response may be a single bit of data (e.g. button is either pressed or not pressed) or it may be more complex (e.g. a specific keyboard entry or spoken word or words is expected). In the latter case, the quality of the response (e.g. the fraction of correct keyboard entries or of correct spoken words) is assessed by response analysis system 166. In addition, the elapsed time between stimulus and response may be assessed, using a signal from interrogator 162 to indicate the start of the stimulus to response interval. Alternatively (not illustrated by the Figure) the start of the interval may be indicated by a signal from clock 160 to element 166.

The output of 166 constitutes pilot response information of the first type 210, which serves as an input to logic unit 300. Embodiments of the invention which do not include a means of assessing pilot responses of the first type are possible. Embodiments of the invention which include means for assessing more than one such response are possible. Response assessment systems which use clock information to deliver prompts at non-fixed intervals are possible, as are systems which deliver prompts at fixed intervals. Systems which increase or decrease the prompt frequency in response to other contingencies are possible. For example, if the pilot has responded appropriately to a warning indicator during the last 15 seconds, or if the pilot has appropriately maneuvered the aircraft in a similar time frame, a pilot interrogation which comes due simultaneously or in a similar time frame may be omitted. Another example is as follows: If the pilot responses indicate mild impairment, an increased prompt frequency and response assessment may be caused to occur.

Figure 2:
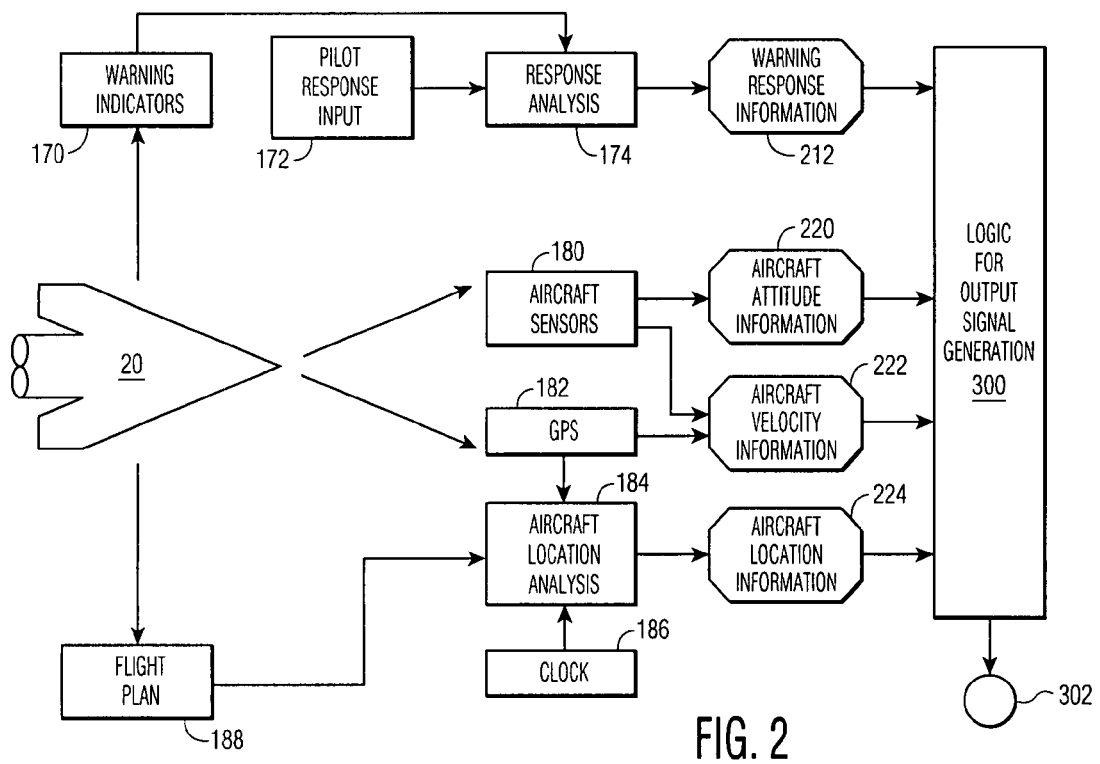
FIG. 2 is a block diagram showing a machine (an aircraft) having a plurality of sensors and other electronic devices, each connected to at least one associated signal processor for assessing pilot performance in accordance with the present invention.

Referring to FIG. 2, elements 170, 172, and 174 show a means of assessing pilot responses of the second type. A system or condition aboard aircraft 20, which may or does require pilot action may be brought to pilot attention by an indicator light, sound, screen message, or other system status or warning indication means 170. The pilot response to the status information or warning, besides being inputted to the appropriate aircraft system requiring the response, is also inputted at 172 to response analysis system 174. Element 174 may assess:

(a) the presence or absence of pilot response;
(b) the appropriateness of the pilot response; and/or
(c) the time from warning indicator start until pilot response. This time interval may be assessed using a signal from warning indicator 170 to indicate the start of the stimulus to response interval.

The output of 174 constitutes warning response information 212, and is one form of pilot fitness information which inputs logic unit 300.

Embodiments of the invention which do not include means for assessing pilot response to warning conditions are possible.

Aircraft information including attitude 220, velocity 222 and location 224 may be used for pilot fitness assessment. Inappropriate pitch, roll, yaw, or rate of change of these parameters, detected by aircraft sensors 180, may constitute an indication that the pilot is incapable of properly flying the aircraft. An inappropriate velocity—either too fast or too slow, may also indicate pilot incapacity. Such velocity information may be obtained from aircraft sensors 180 or derived from Global Positioning Satellite (GPS) information 182. Inappropriate aircraft location may also constitute evidence of pilot incapacity. The appropriateness of aircraft location may be assessed by location analysis system 184 with inputs from each of the following:

(a) GPS data 182;
(b) clock 186; and
(c) flight plan data 188.

For example:
(a) The aircraft may be located at a point which was not called for by the flight plan; or
(b) The aircraft may be located at a point which was called for by the flight plan, but which was expected to be traversed at a time which is significantly earlier or later than the current instant.

Embodiments of the system which do not sense all of these aircraft parameters are possible, as are embodiments which sense additional parameters (e.g. g-forces), as are embodiments which do not sense any aircraft parameters.

Aircraft information 220, 222 and 224 inputs logic unit 300.

The aforementioned pilot information 200, 210 and 212, and aircraft information 220, 222 and 224 is processed by logic unit 300. Unit 300 may be a microprocessor, part of a microprocessor, a computer or part of a computer. The information processing may include any one of a very large number of possible systems of analysis including:
(a) PITO (if 300 is on-board the aircraft)/RITO (if 300 is off-aircraft) signal is generated if any of a number of critical parameters (e.g. EEG, ECG, roll rate, vertical airspeed, location) is more abnormal than a threshold value;
(b) PITO/RITO signal is generated if certain combinations of parameters are all abnormal (e.g. heart rate greater than 200 and systolic blood pressure less than 65, both for a period of one minute); and
(c) more complex combinations of abnormalities (e.g. heart rate greater than 200 and systolic blood pressure less than 65, both for a period of 30 seconds; and either (i) aircraft roll rate exceeds a critical value or (ii) vertical airspeed exceeds a critical value).

In addition, there may be integration of time and/or location parameters into the takeover analysis decision (e.g. a certain roll rate is acceptable at an altitude of 20,000 feet but not at 200 feet).

Embodiments of the system without logic unit 300, in which no analysis of the data from elements 200-224 is performed, and in which the data is transmitted directly to an off-aircraft monitoring system or person are possible.

The output 302 of logic unit 300 is either:
(a) used as an input to an onboard PITO interface, whereby it constitutes (if indicating the need for PITO) the equivalent of a PITO command;
(b) transmitted to an off-aircraft monitoring system or person, to be used by the monitoring system or person for making a RITO decision; or
(c) used as an input to an onboard PITO interface and transmitted off aircraft. Dual availability of the output of 300 allows off aircraft monitoring (and potential overruling) of a PITO (or non-PITO) decision.

Embodiments of the system in which both the outputs of 200-224 and the output of 300 are transmitted off-aircraft are possible. Any of the aforementioned embodiments may also include the transmission off-aircraft of (a) entirely unprocessed pilot-related data (e.g. pilot keyboard inputs 164 reflecting pilot response to a prompt), and/or (b) partially processed pilot related data (e.g. heart rate or PR interval data, coming from the ECG signal processing 142).

Embodiments of the system with other types of pilot or aircraft input to logic unit 300 are possible.

This system and methodology could be used on aircraft with more than one pilot, by having a duplicate assessment system for each pilot. The outputs from each pilot would serve as inputs for a common, single logic unit 300, which would generate a takeover signal only if both pilots were simultaneously impaired.

Embodiments of the system which (a) do allow, and (b) do not allow the return of control to the pilot are possible. Return of control might be considered after certain abnormalities which triggered the PITO/RITO (e.g. a heart rate or blood pressure condition) have resolved.

Embodiments of the invention are possible in which three or more levels of pilot fitness are defined, to be assessed by automated pilot assessment equipment either on or off of the aircraft (or by a human assessor, on or off aircraft). In this embodiment, in the event of:
(a) a high level of on-board pilot competence (e.g. systolic blood pressure above 88), the on-board pilot continues to control the aircraft;
(b) an intermediate level of on-board pilot competence (e.g. systolic blood pressure 74 to 88), pilot assessment equipment or personnel may allow continued on-board pilot control (with or without an increased level of pilot surveillance), or may cause the alternate source of control to take control of the aircraft; and
(c) a low level of on-board pilot competence (e.g. systolic blood pressure below 74), pilot assessment equipment or personnel cause the alternate source of control to take control of the aircraft.

A preferred method of this embodiment entails on-aircraft generation of a PITO signal in the event of a low level of pilot competence, and causes the assessment of intermediate levels of pilot competence to be made by an off-aircraft human, whose options include:

(a) sending or not sending a RITO signal;
(b) communicating with the pilot; and
(c) causing the pilot assessment system to assess the pilot more frequently or in greater detail.
2. Allowing the Return of Control (ROC) to the Impaired Pilot if Certain Conditions are Met
2.1 Return of Control, General Concepts Table 1, below, shows a list of possible Return of Control ("ROC") strategies:

TABLE 1

Return of Control (ROC) Options

| OPTION # | DESCRIPTION |
|---|---|
| 1 | ROC not possible |
| 2 | ROC as soon as the abnormality which triggered TO is remedied |
| 3 | ROC - possible for non-severe TO trigger; but not possible for severe TO trigger |
| 4 | ROC Confirmation of automated ROC decision by a human other than the pilot is required: Variations: A) for all ROC B) for ROC where TO trigger was a severe event |
| 5 | No automated input to ROC decision: human only |
| 6 | Hysteresis pre-ROC |
| 7 | Probation post ROC |

The simplest embodiments of the invention are those in which either (a) ROC is not possible under any circumstances [Option 1, above], or (b) ROC occurs automatically the problem which triggered takeover ("TO") no longer exists [Option 2, above]. An example of the latter would be the sequence:
i) TO triggered by pilot heart rate <40, followed by
ii) ROC occurring as soon as pilot heart rate rises above 40.

However, many more complex scenarios can be considered and systems which embody these concepts can be designed.

Option 3 entails dividing TO triggers into severe events and less than severe events. Examples of severe events include pilot ventricular tachycardia, and pilot asystole. Examples of non-severe events include bradycardia, and hypotension. Embodiments of the invention with three or more tiers of TO trigger severity are possible, wherein each tier is associated with a progressively greater extent of confirmation requirement that ROC is acceptable; and wherein one tier is associated with ROC not being possible (discussed below in conjunction with Option 4).

Option 4A calls for both machine and human agreement that control should be restored. For example: An aircraft pilot in which TO is triggered by a heart rate <40 would require machine/algorithmic call for ROC (e.g. because of heart rate > or =40) and confirmation of ROC by a human (who may further assess the situation in any one of a number of ways).

Option 4B calls for machine and human agreement about ROC only when a severe condition triggered TO (e.g. TO triggered by heart rate <30), but which allows machine-only ROC for less severe TO triggers (e.g. TO triggered by heart rate <40). Table 2 shows an example of a three tier hybrid of Option 3 and Option 4B would be:

TABLE 2

Complex ROC Example

| TO Trigger | ROC |
|---|---|
| Heart Rate <40 | Machine only |
| Heart Rate <30 | Machine and Human |
| Heart Rate <20 | ROC not possible |

Option 5 calls for only humans making the ROC decision. The advantage of such an approach is that subtle nuances relating to the current competence of the previously impaired operator may be carefully weighed, perhaps by another experienced operator. The disadvantage is that allowing ROC makes the system less hardened to outside interference. These aforementioned advantages and disadvantages also apply to Option 4.

Hysteresis, Option 6, calls for the restoration of conditions which are better than those which triggered TO. For example, if heart rate <30 triggered TO, hysteresis may call for the restoration of a heart rate of 50 before ROC is possible. Hysteresis may be time dependent. Quite a few variations of this concept are discussed hereinbelow in Section 1.2.

Probation, Option 7, calls for a period of observation post ROC, wherein repeat TO may occur with a threshold which is less extreme than that initially called for. For example, if the initial TO trigger is a heart rate <30, and later on, the heart rate rises to 50, and ROC occurs; the repeat TO trigger could be a heart rate <40. The probation may be time dependent. Quite a few variations of this concept are discussed hereinbelow in Section 2.3.

2.2 Hysteresis Prior to ROC

Figure 3:
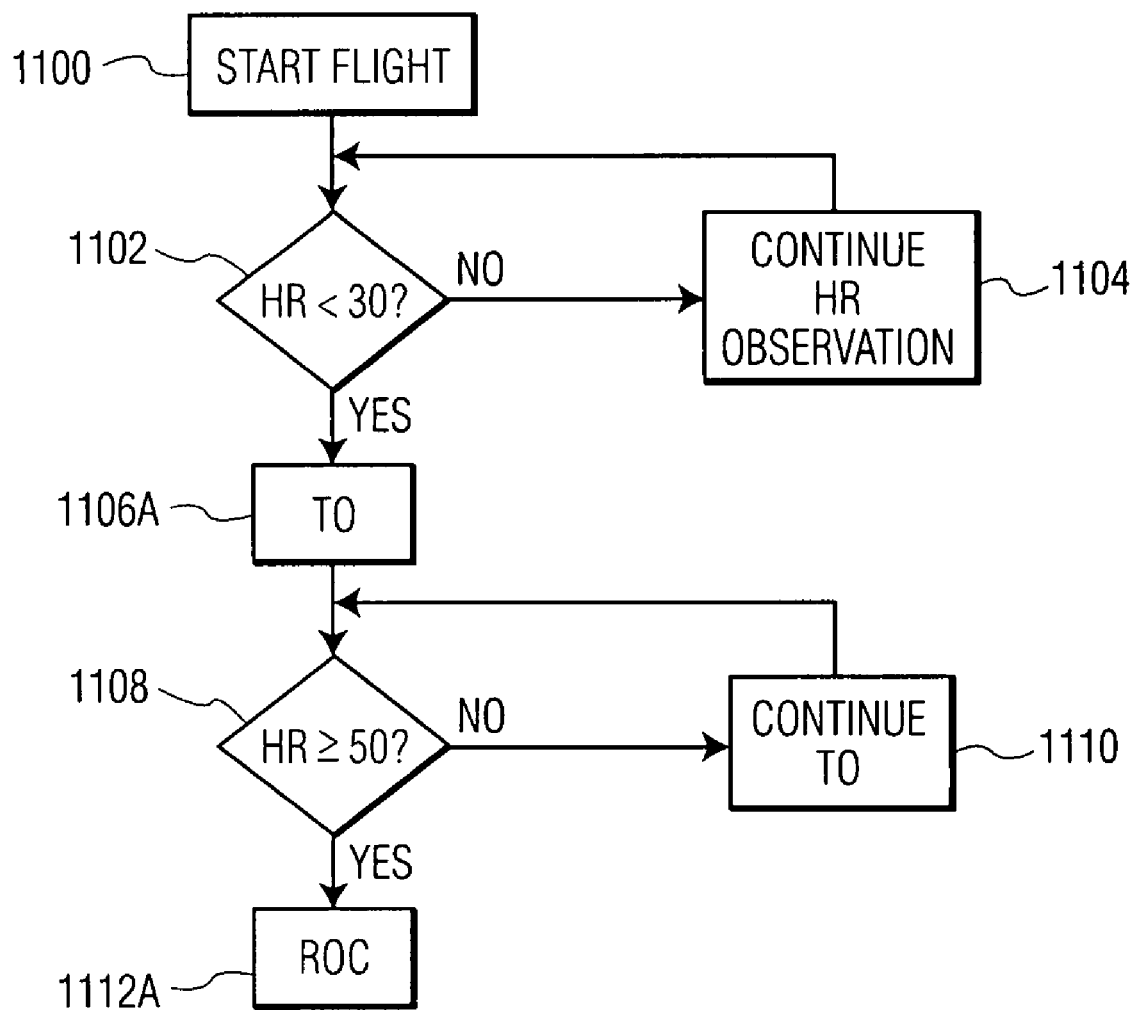
FIG. 3 is a flow diagram of a rate hysteresis format with regard to ROC in the case of a low heart rate.

A simple example of hysteresis pre ROC is shown in FIG. 3, in which an abnormally low heart rate triggers TO. In the case of a solo-piloted aircraft, once the flight has started, block 1100, the pilot's heart rate is continuously monitored to detect a value less than 30 beats per minute, block 1102. If such a rate is not detected, block 1104, monitoring continues. If such a rate is detected, block 1106, TO occurs. Thereinafter, the TO state (wherein an alternate pilot is in command) persists as long as the heart rate remains less than 50, blocks 1108 and 1110. However, if the rate rises to > or =50, block 1112, ROC may occur.

Figure 4:
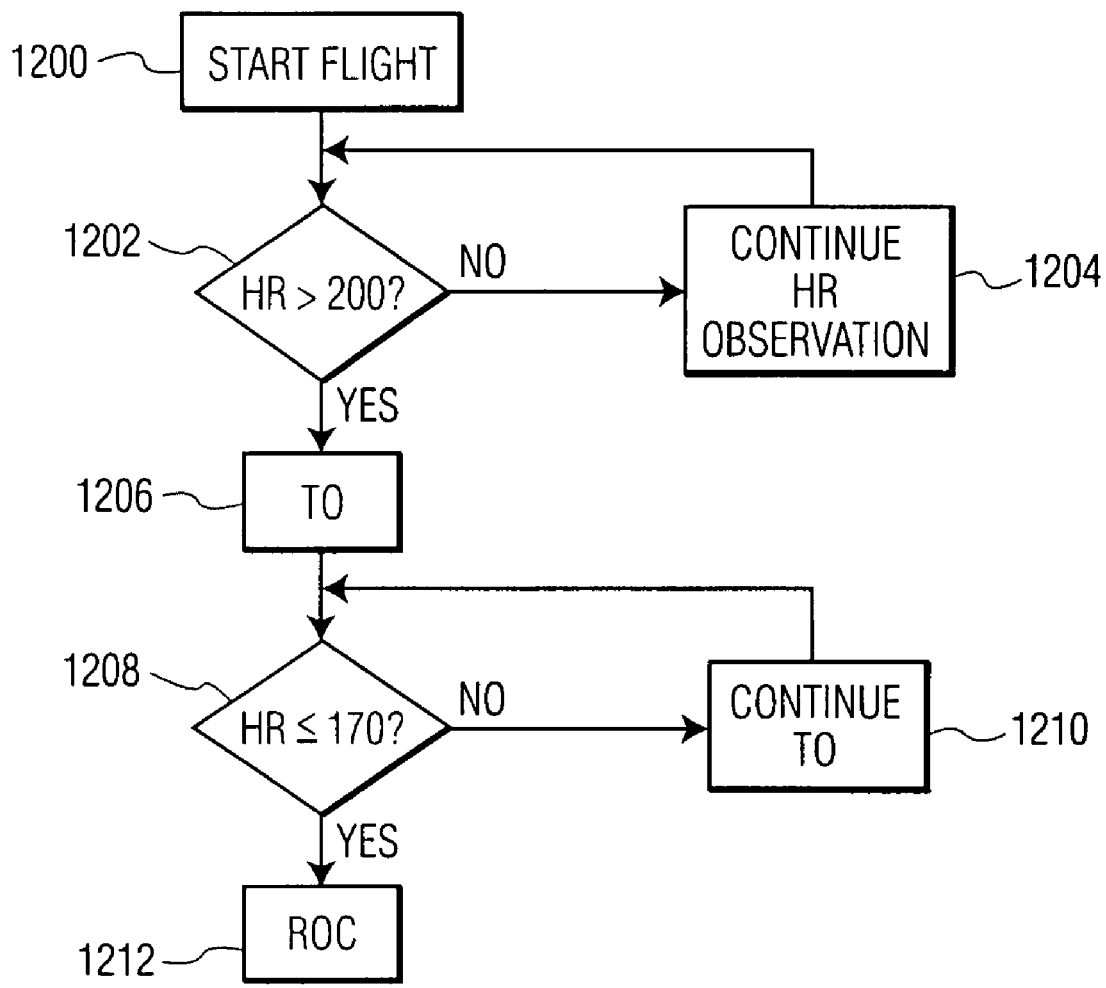
FIG. 4 is a flow diagram of a rate hysteresis format with regard to ROC in the case of a high heart rate.

Another simple example of hysteresis pre ROC is shown in FIG. 4, in which an abnormally high HR triggers TO. In the case of a solo-piloted aircraft, once the flight has started, block 1200, the pilot's heart rate is continuously monitored to detect a value greater than 200 beats per minute, block 1202. If such a rate is not detected, block 1204, monitoring continues. If such a rate is detected, block 1206, TO occurs. Thereinafter, the TO state persists as long as the heart rate remains greater than 170, blocks 1208 and 1210. However, if the rate falls to < or =170, block 1212, ROC may occur.

Figure 5:
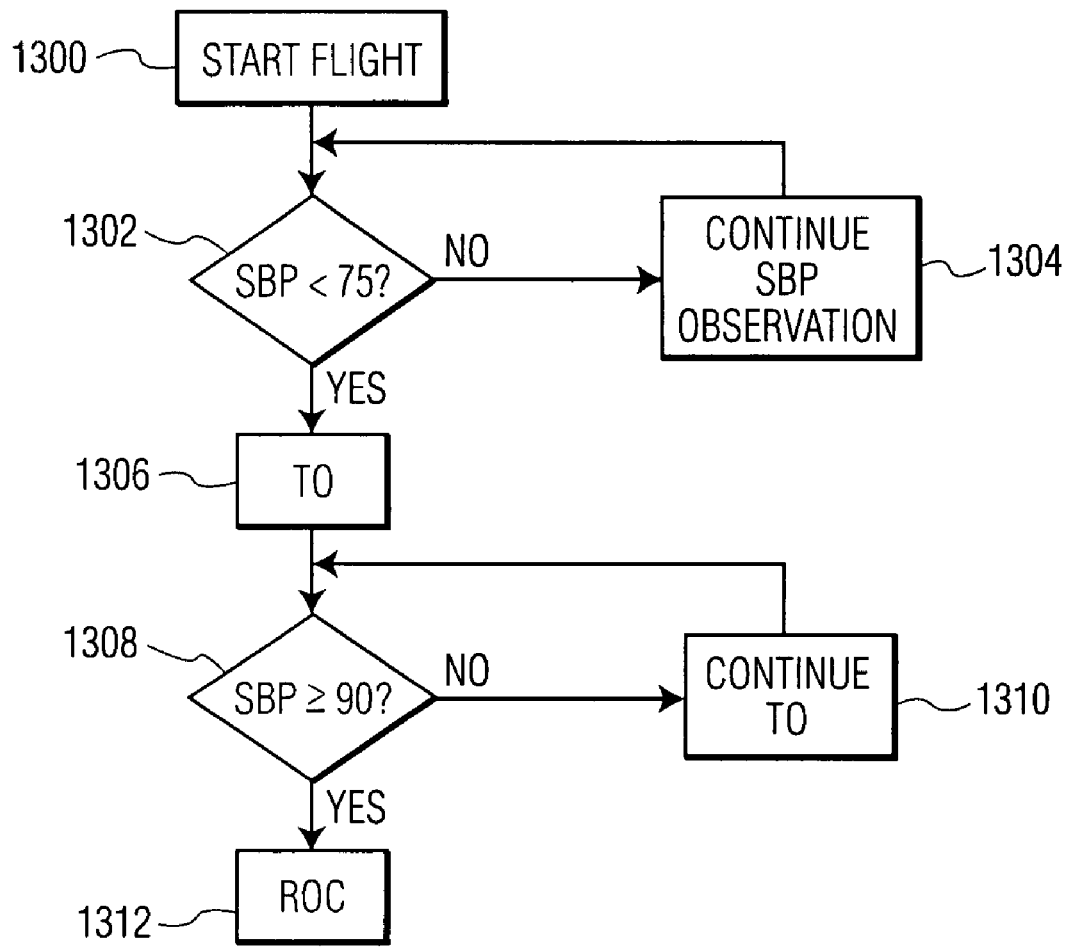
FIG. 5 is a flow diagram of a pressure hysteresis format with regard to ROC in the case of a low systolic blood pressure.

Another simple example of hysteresis pre ROC is shown in FIG. 5, in which an abnormally low systolic blood pressure triggers TO. In the case of a solo-piloted aircraft, once the flight has started, block 1300, the pilot's systolic blood pressure is monitored to detect a value less than 75 millimeters of mercury, "mm Hg," block 1302. If such a pressure is not detected, block 1304, monitoring continues. If such a pressure is detected, block 1306, TO occurs. Thereinafter, the TO state persists as long as the systolic pressure remains less than 90, blocks 1308 and 1310. However, if the pressure rises to > or =90, block 1312, ROC may occur.

Figure 6:
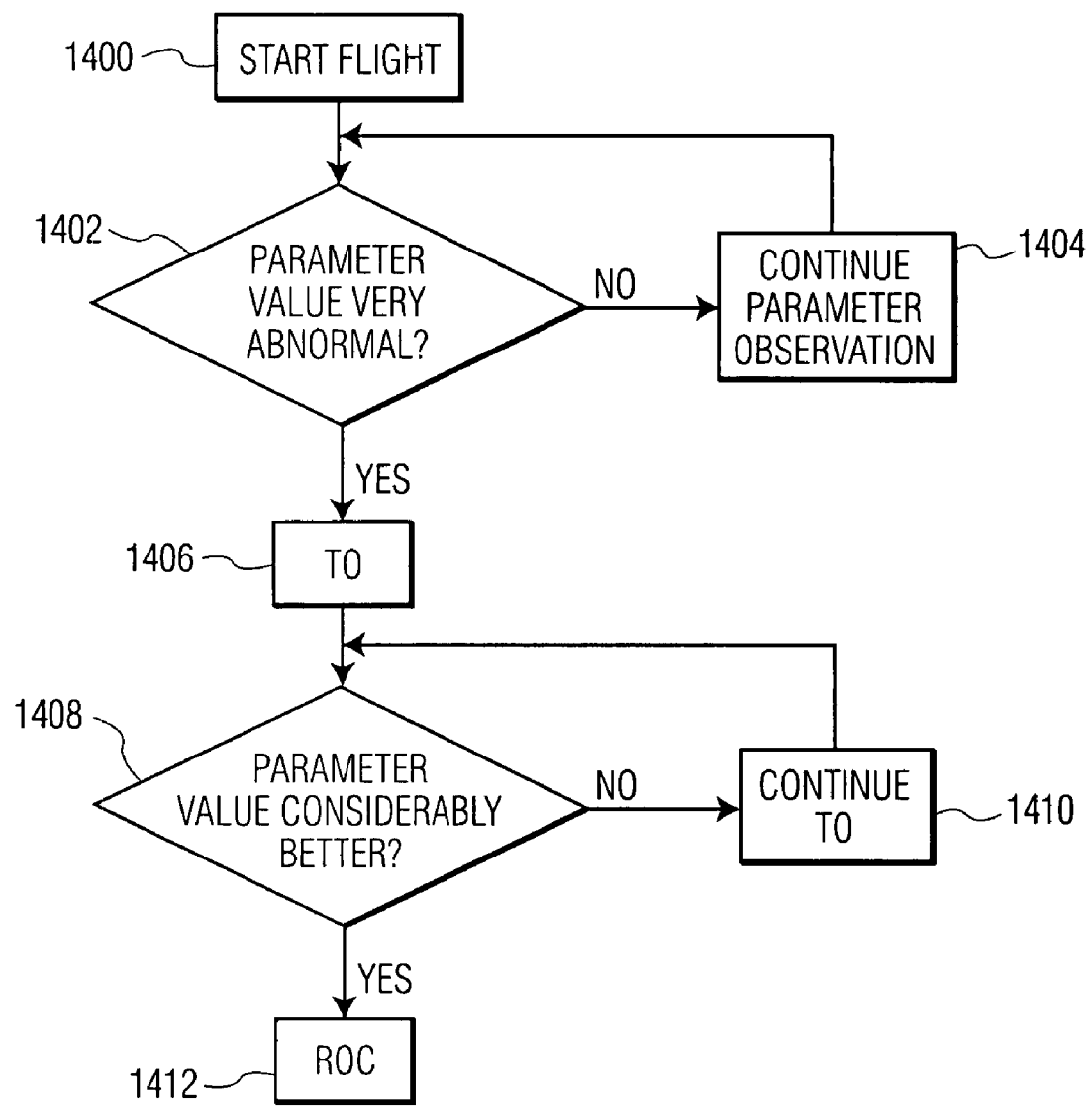
FIG. 6 is a flow diagram of a hysteresis format with regard to ROC in the case of a generalized parameter.

A generalized example of hysteresis pre ROC is shown in FIG. 6, in which a very abnormal parameter value triggers TO. In the case of a solo-piloted aircraft, once the flight has started, block 1400, the pilot's parameter is monitored to detect a very abnormal value (the "triggering value"), block 402. If a very abnormal value is not detected, block 1404, monitoring continues. If a very abnormal value is detected, block 1406, TO occurs. Thereinafter, the TO state persists as long as the parameter measurement does not yield a value which is considerably better (i.e. less abnormal) than the triggering value, blocks 1408 and 1410. However, if the parameter measurement does yield a value which is considerably better than the triggering value, block 1412, ROC may occur.

In the aforementioned examples, embodiments of the invention in which ROC may require the confirmation of a human arbiter (in addition to attaining the hysteresis rate) are possible. Embodiments of the invention in which the parameter is sampled on a frequent basis (e.g. heart rate sampled on a beat to beat basis) are possible, as are embodiments in which the rate is averaged over a longer period.

Figure 7:
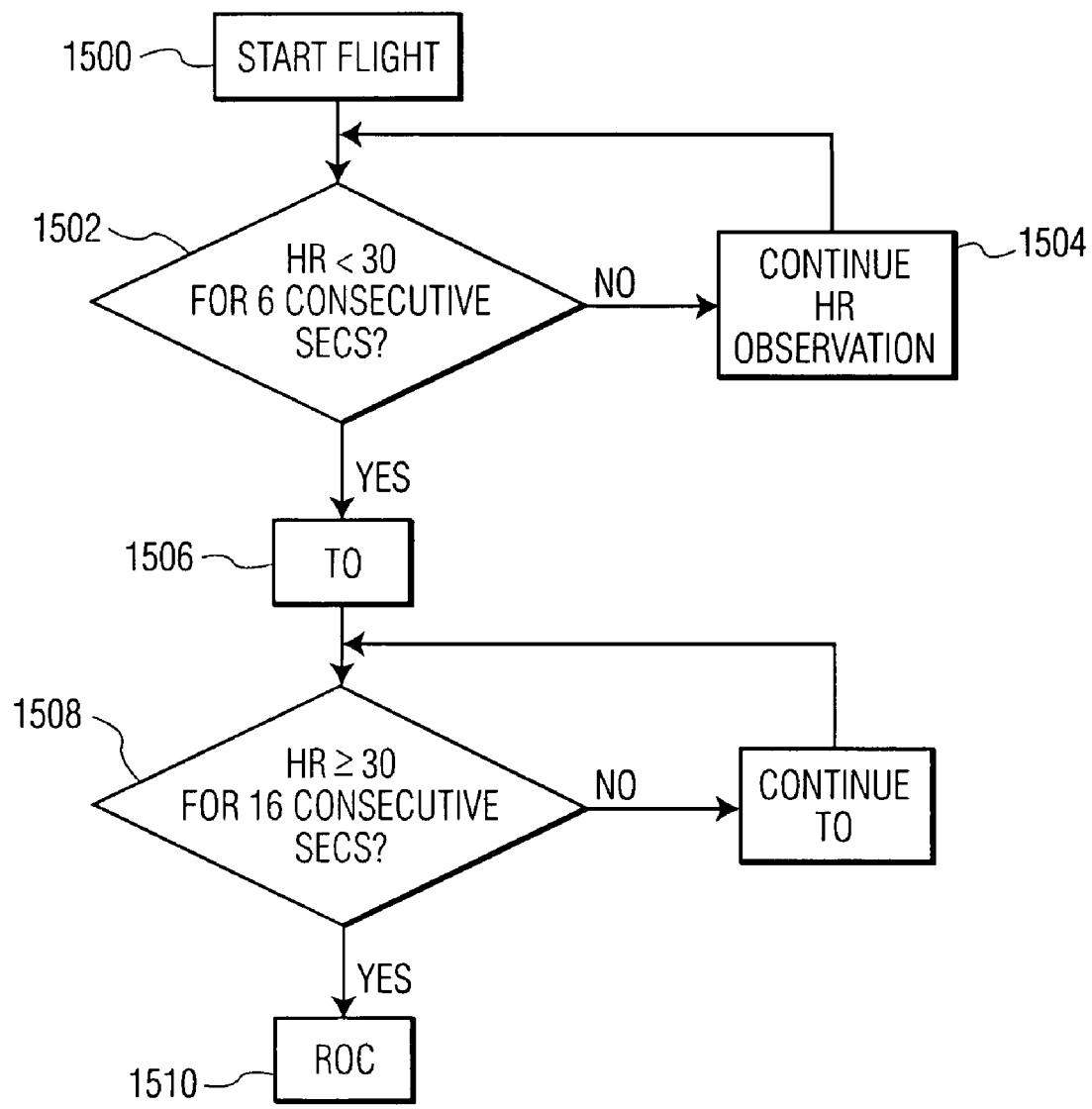
FIG. 7 is a flow diagram of a duration hysteresis format with regard to ROC in the case of a low heart rate.

FIG. 7 shows an example in which the duration of an abnormal parameter is the emphasis of the hysteresis (as opposed to the previous examples in which the magnitude of the deviation of the parameter value from the norm was the emphasis of the hysteresis). In the case of a solo-piloted aircraft, once the flight has started, block 1500, the pilot's heart rate is continuously monitored to detect a value less than 30 beats per minute, lasting for at least 6 continuous seconds, block 502. If such a condition is not detected, block 1504, monitoring continues. If such a condition is detected, block 1506, TO occurs. Thereinafter, the TO state persists until the rate rises to > or =30 for a continuous period of at least 16 seconds, block 1508, at which time ROC, block 1510, may occur. Examples of such "duration hysteresis" where the measured parameter is systolic pressure, or any other physiologic or other parameter are possible.

Figure 8:
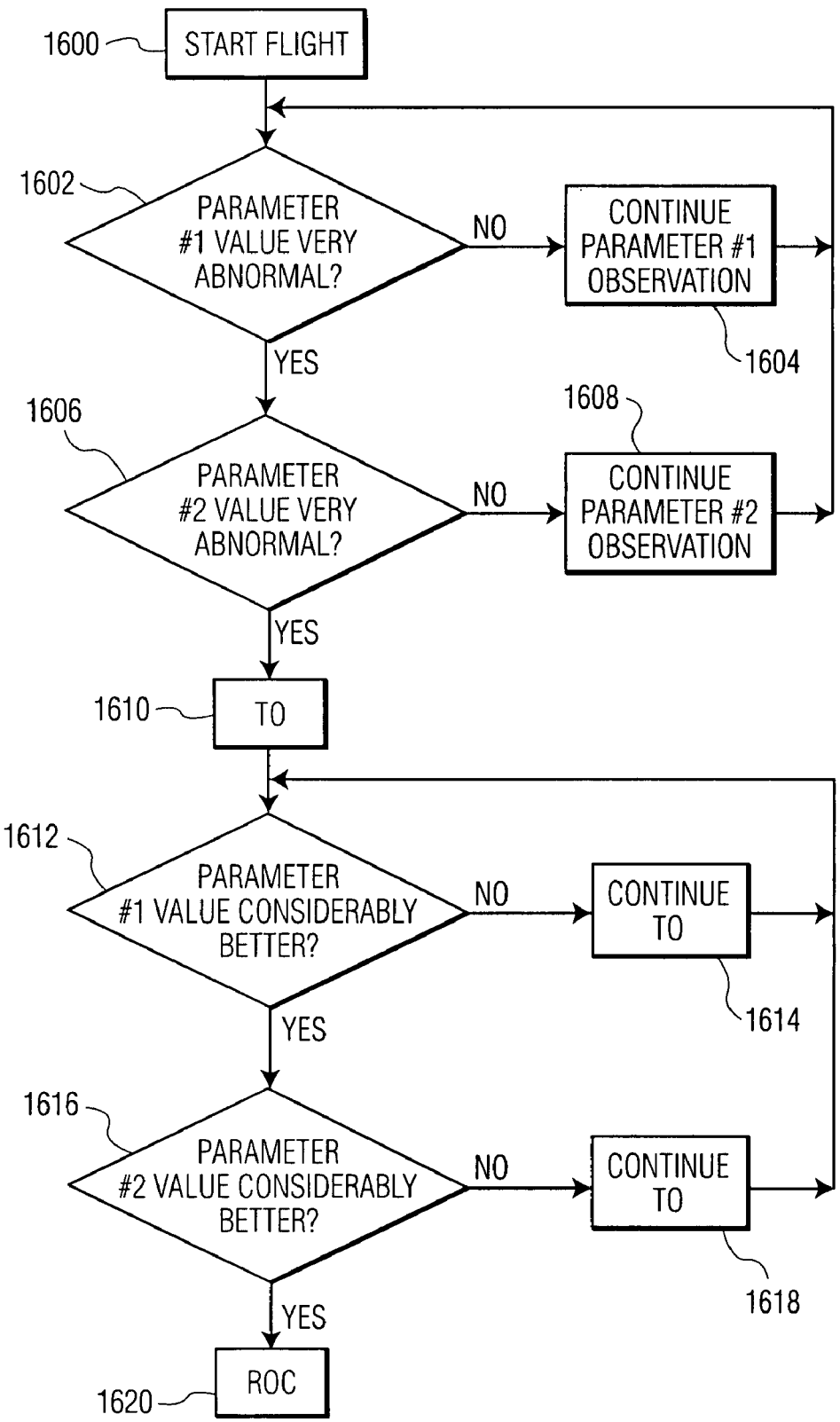
FIG. 8 is a flow diagram of a hysteresis format with regard to ROC in the case of two generalized parameters.

FIG. 8 shows an example of hysteresis pre ROC in which very abnormal values of both of two parameters trigger TO. In the example shown, generalized parameters are presented. After the start of the flight, block 1600, if the value of parameter #1 is not very abnormal, observation continues: block 1602 to block 1604, back to block 1602, to block 1604, etc. (In an alternate embodiment of the invention, observation could begin before the start of the flight, i.e. once the pilot is situated in the cockpit, but before takeoff has occurred.) If the value of parameter #1 is very abnormal (block 1602 to block 1606), but the value of parameter #2 is not very abnormal (block 1606 to block 1608), the observation process continues (block 1608 to block 1602). However, if the value of parameter #2 is also very abnormal, aircraft takeover occurs (block 1606 to block 1610).

At this point, in order for ROC to occur, each of the two aforementioned parameters must return to a considerably better value. Block 1610 leads to block 1612, and if the value of parameter #1 is not considerably better (1612 to 1614), the takeover state persists (1614 to 1612, to 1614 to 1612 . . . ). But, if the value of parameter #1 is considerably better (compared to its very abnormal value at the time of TO), block 1612 leads to block 1616, at which point the value of parameter #2 is examined. If the parameter #2 value at that time is not considerably better than its very abnormal value at the time of TO, block 1616 leads to 1618, which leads to 1612, and the observation process for both parameters repeats. If, however, the parameter #2 value is considerably better than its very abnormal value at the time of TO, block 1616 leads to 1620, and ROC occurs.

Embodiments of the invention are possible in which the values of each of the two parameters are examined simultaneously rather than sequentially. The operating principle, however would be the same: Takeover if both parameters have very abnormal values, and ROC when both parameters have considerably better values.

An example of two parameters whose values could be used together is heart rate and systolic blood pressure. Very abnormal values are heart rate above 200 beats per minute and systolic blood pressure less than 80 mm. Hg. Considerably better values are heart rate below 180 beats per minute and systolic blood pressure above 90 mm. Hg. The reason for the co-dependence of takeover on both parameters is that with a heart rate of e.g. 210 b.p.m., some individuals will have a systolic blood pressure which is high enough to allow them to function reasonably (e.g. above 80 mm. Hg.), while other individuals, will have a blood pressure less than 80, and will be unable to perform properly. Furthermore, intra-individual differences may occur from one minute to the next: The individual with the heart rate of 210 may initially have a systolic pressure above 80, but with the passage of time, the pressure may fall to less than 80.

Many other examples of:
a) pairs of parameters;
b) the values of each parameter considered to be very abnormal; and
c) the value of each parameter considered to be considerably better
will be obvious to those skilled in the art.

In still another embodiment of the invention, formats in which takeover occurs when both parameter values are very abnormal, and return of control occurs when only one of the parameter values has returned to a considerably better value, are possible. In the aforementioned example, ROC could occur with this embodiment, if the systolic pressure rises to a value which is greater than 90, even though the heart rate remains very abnormal, at a rate above 200.

Embodiments of the invention in which three or more parameter values are used in the TO decision-making process, are possible. Embodiments in which TO occurs only if all of the parameter values are very abnormal, are possible. Other embodiments are possible in which TO occurs if a predetermined fraction of the parameter values (e.g. any two out of three) are very abnormal. Once TO has occurred, embodiments of the invention are possible in which, for ROC to occur:

a) all of the parameter values must return to considerably better values than was the case at the time of TO;
b) some, but not all of the parameter values must return to considerably better values than was the case at the time of TO; and/or
c) any of the parameter values must return to considerably better values than was the case at the time of TO.

In the case of b) immediately above, there may be embodiments in which a fixed fraction (e.g. two out of three) of any combination of parameters return to considerably better values; and there may be still other embodiments where more complex arrangements of parameter value improvement are required for ROC (e.g. some pairs of parameter value improvement result in ROC, but some pairs do not).

Figure 9:
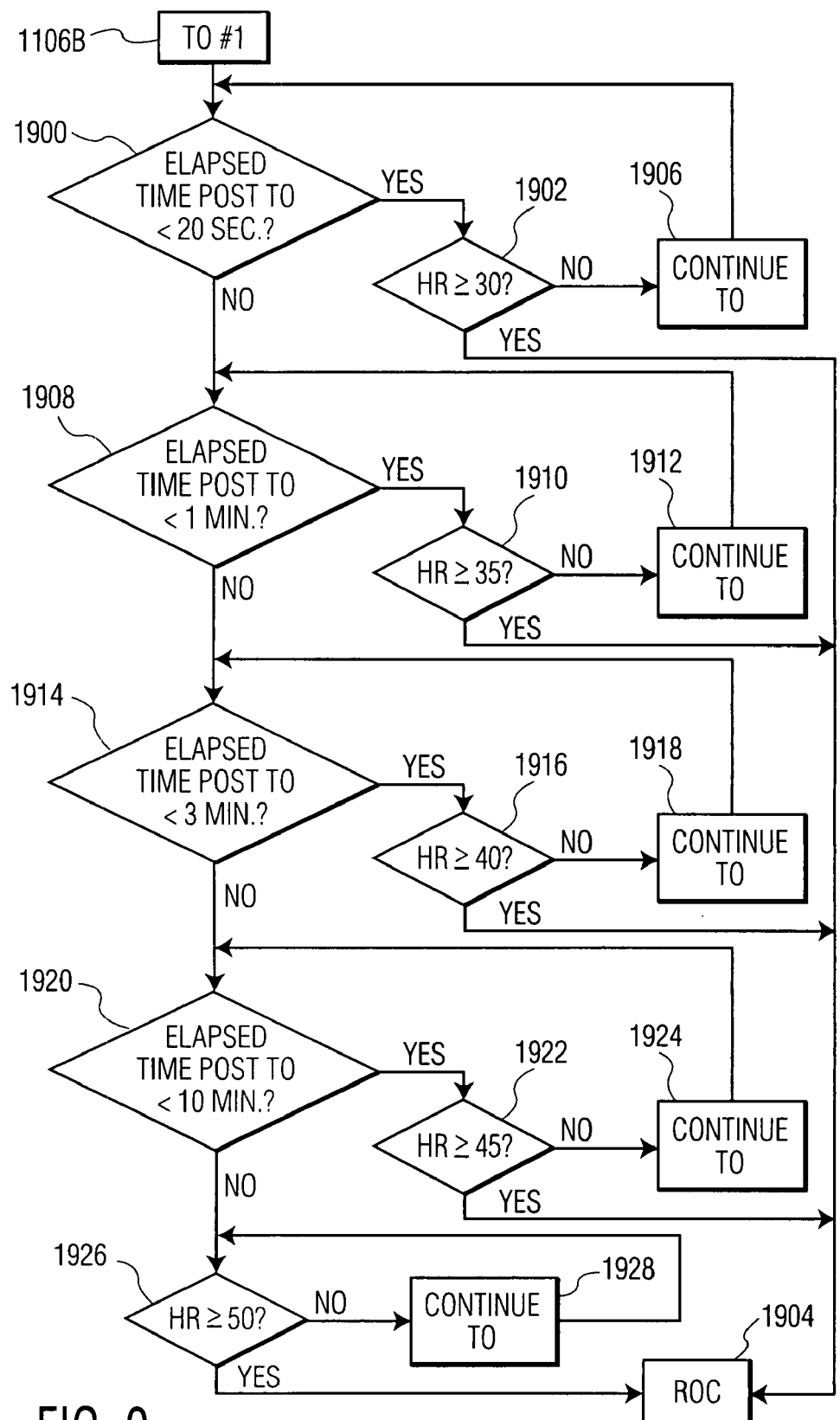
FIG. 9 is a flow diagram showing a method of gradually phasing in hysteresis, in the case of a low heart rate.

FIG. 9 shows a method of hysteresis in which the criteria for ROC depend on the severity of the abnormality which triggered TO. The abnormality in the example is bradycardia, and severity is reflected by the duration of an episode of bradycardia.

The algorithm in the figure begins with a TO, block 1106B, such as might occur for heart rate less than 30 (e.g. as featured in the example shown in FIG. 3 hereinabove). In the example in FIG. 9, if there is a quick improvement in heart rate (i.e. the rate rises above 30 during the first 20 seconds), then ROC occurs, without hysteresis: block 1900 leads to 1902, which leads to 1904, with restoration of pilot control. If, within 20 seconds, the heart rate does not exceed 30, block 1902 leads to 1906, TO continues, and the loop 1902 to 1906 to 1900 to 1902 . . . continues, until 20 seconds have elapsed.

From 20 seconds until 1 minute after TO, block 1908, restoration of control requires a heart rate of greater than or equal to 35 beats per minute, block 1910—i.e. hysteresis is now in effect. If the heart rate reaches 35, block 1910 leads to 1904, with ROC. If the heart rate does not reach 35, the loop consisting of blocks 1908 to 1910 to 1912 to 1908 . . . continues, and TO continues.

According to FIG. 9, the aforementioned loop is exited after 1 minute has elapsed, block 1908 to block 1914. From 1 minute until 3 minutes after TO, restoration of control requires a heart rate of greater than or equal to 40 beats per minute, block 1916. If the heart rate reaches 40, block 1916 leads to 1904, with ROC. If the heart rate does not reach 40, the loop consisting of blocks 1914 to 1916 to 1918 to 1914 . . . continues, and TO continues.

The aforementioned loop is exited after 3 minutes have elapsed, block 1914 to block 1920. From 3 minutes until 10 minutes after TO, restoration of control requires a heart rate of greater than or equal to 45 beats per minute, block 1922. If the heart rate reaches 45, block 1922 leads to 1904, with ROC. If the heart rate does not reach 45, the loop consisting of blocks 1920 to 1922 to 1924 to 1920 . . . continues, and TO continues.

The aforementioned loop is exited after 10 minutes have elapsed, block 1920 to block 1926. From this point on, a heart rate of 50 is required for ROC, block 1926 to 1904. If the heart rate does not reach 50, the loop consisting of blocks 1926 and 1928 continues, and TO continues.

Numerous different examples with time dependent hysteresis will be obvious to those skilled in the art. Such examples include but are not limited to:

A) Examples similar to that shown in FIG. 9, but with different values of heart rate, different amounts of time for each of the heart rate/hysteresis regimes, and different numbers of such regimes;

B) Examples in which high heart rate is the cause of TO and a lower heart rate results in ROC;

C) Examples in which unacceptable values of parameters other than heart rate result in TO—e.g. systolic blood pressure, time to respond to a prompt, etc.; and D) Examples analogous to that shown in FIG. 8, in which multiple parameters are simultaneously examined. In this case, time dependent hysteresis may involve only one of the parameters or may involve more than one.

2.3—Probation Post ROC

Figure 10:
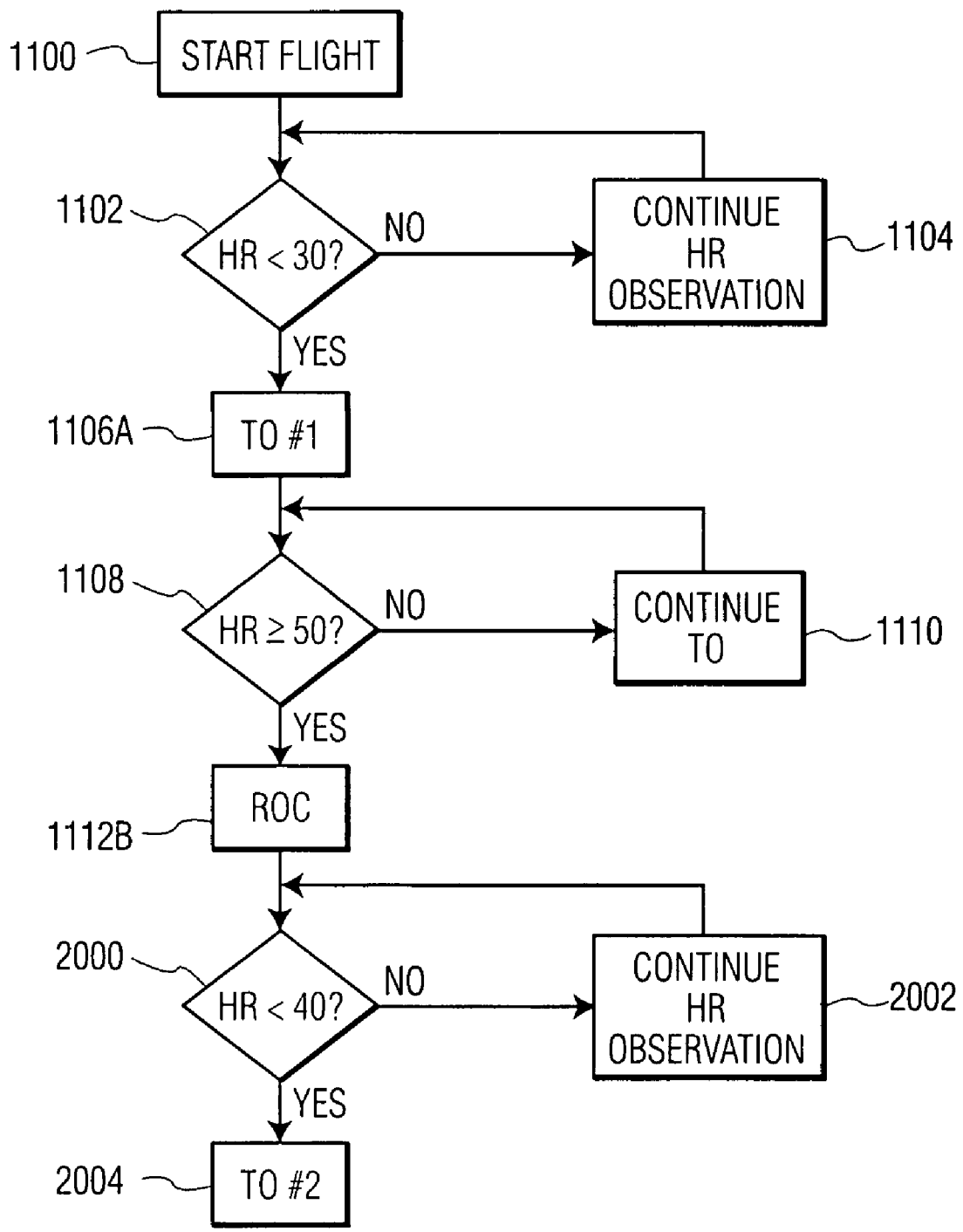
FIG. 10 is a flow diagram of a probation format following ROC, in the case of a low heart rate.

FIG. 10 shows an example of probation following ROC. The parameter involved is heart rate. Elements 1100-1110 of FIG. 10 are identical to their counterparts in FIG. 3, as is the algorithm embodied by the elements in the figure. TO occurs for heart rate less than 30 beats per minute and ROC, block 1112B, occurs for heart rate of greater than or equal to 50.

However, following ROC, a more sensitive heart rate criterion, heart rate less than 40, block 2000, triggers a second TO. In the situation where the heart rate drops below 40 (having, in the past fallen below 30 with resultant TO, followed by its having risen to greater than 50, with resultant ROC), block 2000 leads to 2004, a second TO. If the heart rate remains greater than or equal to 40, the loop consisting of elements 2000 and 2002 is maintained, heart rate observation continues, and the pilot remains in control.

In some situations, hysteresis must accompany probation for an arithmetically tenable situation to occur. For example, in a situation where the rate cutoffs are TO #1 for rate less than 30,
ROC for rate greater than or equal to 30, and
TO #2 for rate less than 40;

then, following TO #1, an increase in heart rate to a value between 30 and 39 would result in ROC, but would also result immediately in TO #2. The only way for ROC to actually occur would be a sudden increase in heart rate from less than 30 to 40 or more: but this implies hysteresis.

Figure 11:
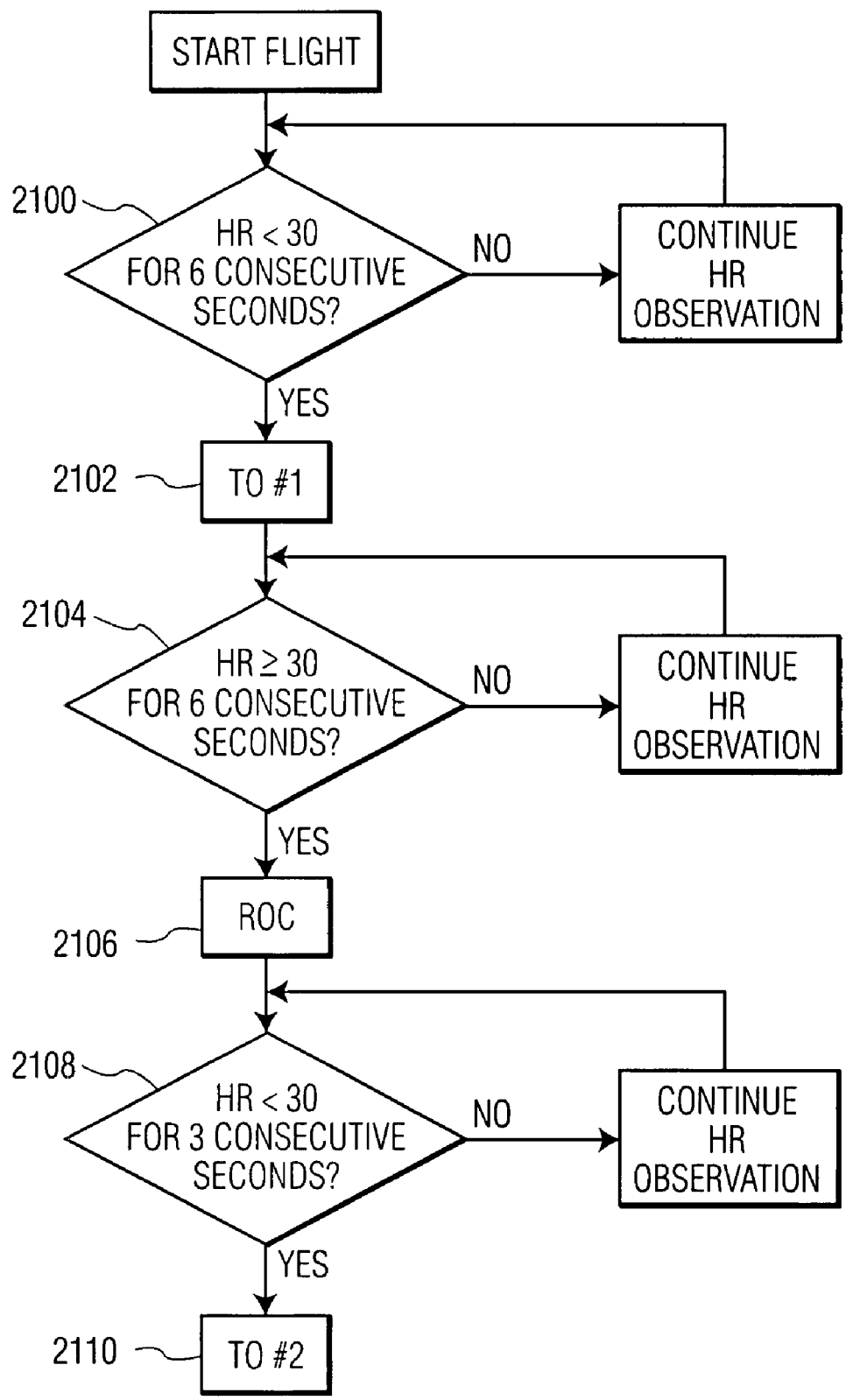
FIG. 11 is a flow diagram of a probation format following ROC, in the case of a low heart rate of variable duration.

However, there are other situations where "pure" probation without hysteresis may occur. FIG. 11 shows such an example, wherein the takeover criterion is heart rate less than 30 for 6 consecutive seconds, block 2100, leading to block 2102. In this example, if the heart rate rise to a value greater than 30 for more than 6 seconds, block 2104, ROC occurs, block 2106. According to the figure, following ROC, a state of probation is set up, such that TO #2 will occur if the heart rate falls below 30 for only 3 consecutive seconds, block 2108 to block 2110.

Figure 12:
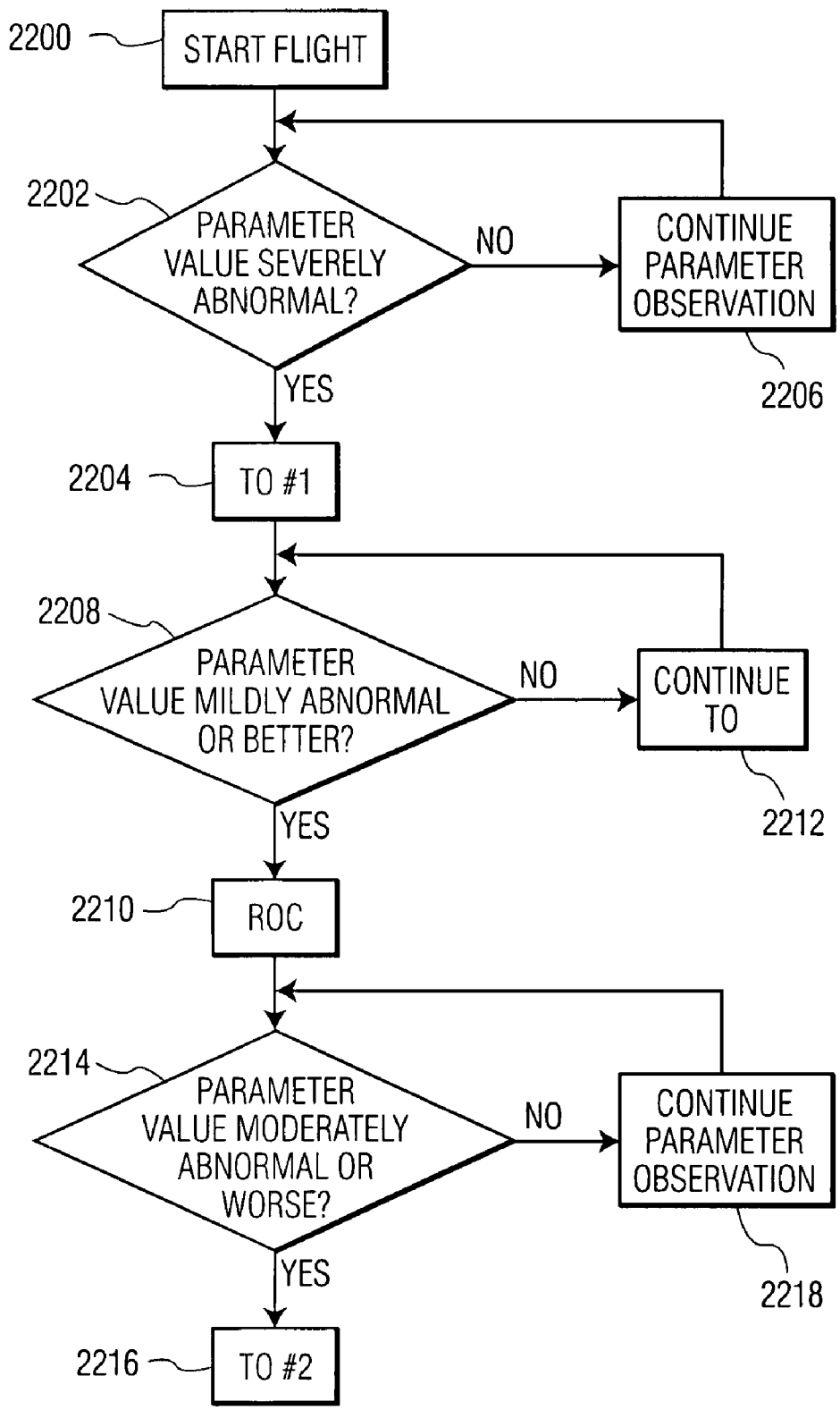
FIG. 12 is a flow diagram of a probation format following ROC, in the case of a generalized parameter.

FIG. 12 shows a generalized version of TO followed by hysteresis followed by ROC followed by probation. Following the start of the flight 2200, a severely abnormal parameter value, block 2202, results in TO #1, block 2204. In the absence of such severe abnormality, the loop formed by blocks 2202 and 2206 results in continued observation, for detection of the severely abnormal parameter value. Examples of severely abnormal values include:

a number, such as a heart rate greater than 250;
an abnormal physiologic state, such as loss of consciousness;
an abnormal cognitive state, such as repeated failure to respond to prompts; and
an abnormal machine state, such as an extremely inappropriate location or velocity.

Referring again to FIG. 12, following TO #1, return of the parameter value to a mildly abnormal or better value, block 2208, results in ROC, block 2210. In the absence of such improvement, the loop formed by blocks 2208 and 2212 results in continued observation, for detection of the aforementioned improvement.

Following ROC, return of the parameter value to a moderately abnormal or worse value, block 2214, results in TO #2, block 2216. In the absence of such worsening, the loop formed by blocks 2214 and 2218 results in continued observation, for detection of the aforementioned worsening.

Figure 13:
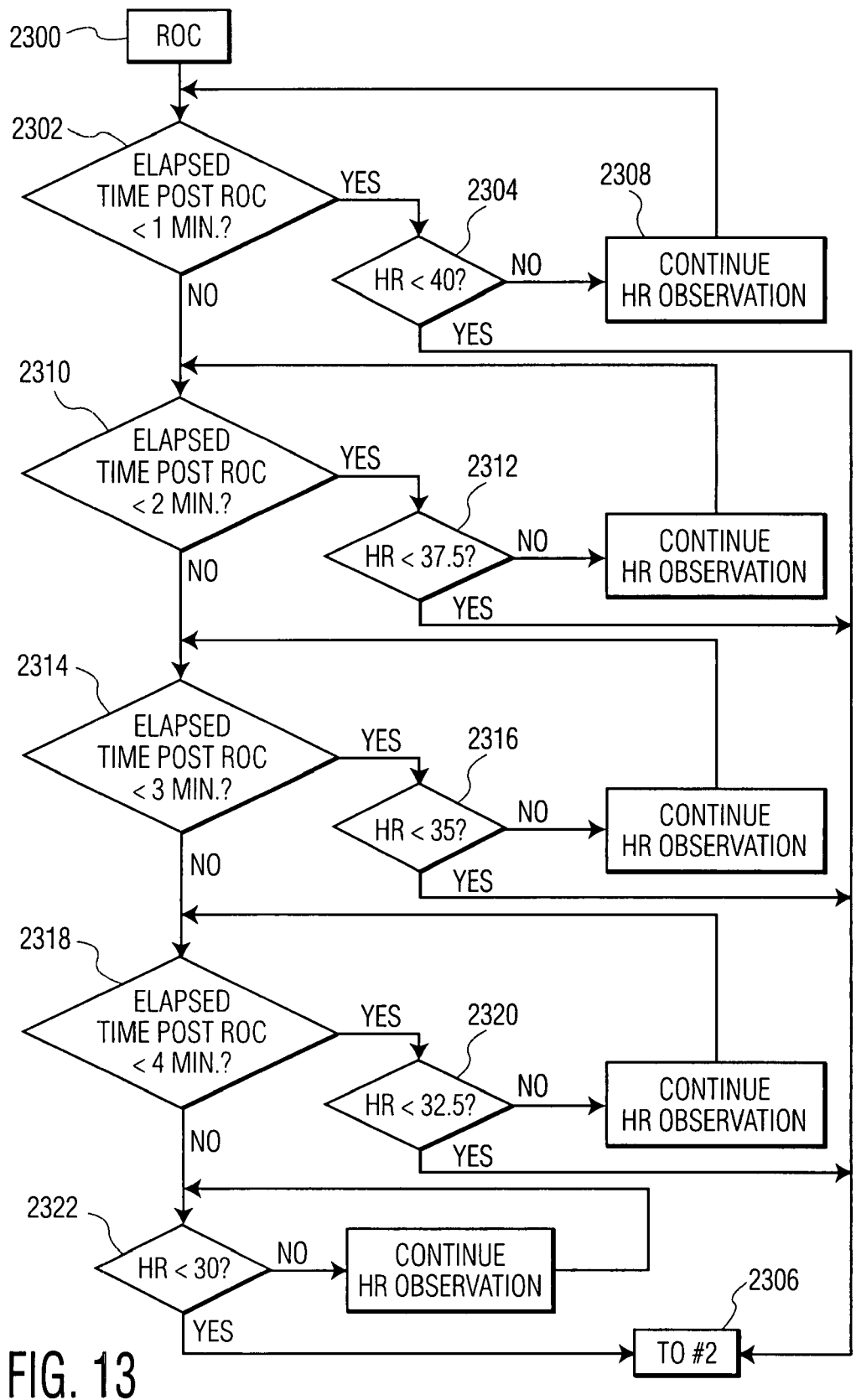
FIG. 13 is a flow diagram showing a gradual phasing out of probation, in the case of a low heart rate.

FIG. 13 shows an algorithm which supports a time-dependent method of probation. The concept is: Immediately following ROC, there would be greater concern about pilot fitness than there would be later, after a number of minutes during which the pilot has the opportunity to demonstrate adequate performance capability.

The example shown in FIG. 13 may be viewed as an application of this approach to the probation algorithm of FIG. 10. The FIG. 10 algorithm shows:

TO #1 for heart rate <30;
ROC for heart rate > or =50; and
TO #2 for heart rate <40.

The FIG. 13 algorithm shows a gradual "relaxation" of the probation parameter, such that over a period of 4 minutes following ROC, the probation is gradually phased out, be a series of intermediate steps which include successively less restrictive probation parameters.

Following ROC 2300, during the first post-ROC minute, block 2302, repeat TO 2306 occurs if the heart rate falls below 40, block 2304. If the heart rate does not fall below 40 during the first minute, observation continues over the repeating loop 2304 to 2308 to 2302 to 2304 . . . .

After the first minute, block 2302 leads to block 2310. During the second minute, the probation parameter—i.e. the heart rate resulting in TO #2—is set at 37.5 beats per minute, block 2312.

During the third minute post ROC, block 2314, the probation parameter is reduced down to 35 beats per minute, block 2316. During the fourth minute post ROC, block 2318, the probation parameter is reduced down to 32.5 beats per minute, block 2320. At the end of four minutes, according to the algorithm, the probation parameter is eliminated; that is, the heart rate which triggers at TO at that point (<30) is the same one that triggered it initially (i.e. before TO #1).

Embodiments of the invention with numerous variations are possible, including but not limited to:

A) examples similar to that shown in FIG. 13, but with different values of heart rate, different amounts of time for each of the heart rate/probation regimes, and different numbers of such regimes (i.e. until probation is phased out);

B) examples in which high heart rate is the cause of TO and in which a variable (and gradually increasing) value of high heart rate is the monitored parameter, post ROC;

C) examples in which unacceptable values of parameters other than heart rate result in TO, and are monitored post ROC—e.g. systolic blood pressure, time to respond to a prompt, etc.; and D) examples in which multiple parameters are simultaneously examined. In this case, time dependent probation may involve only one of the parameters or may involve more than one.

2.4—ROC Following Second TO

If a second takeover occurs, the options, broadly stated, with regard to the possibility of a second ROC, "ROC #2" following TO #2, are:

A) ROC #2 is possible, without hysteresis
B) ROC #2 is possible, with hysteresis which is similar to that involved in ROC #1;
C) ROC #2 is possible, with hysteresis which imposes the need for achieving a higher pilot fitness standard, than is involved in ROC #1; and
D) No further ROC is possible.

Figure 14:
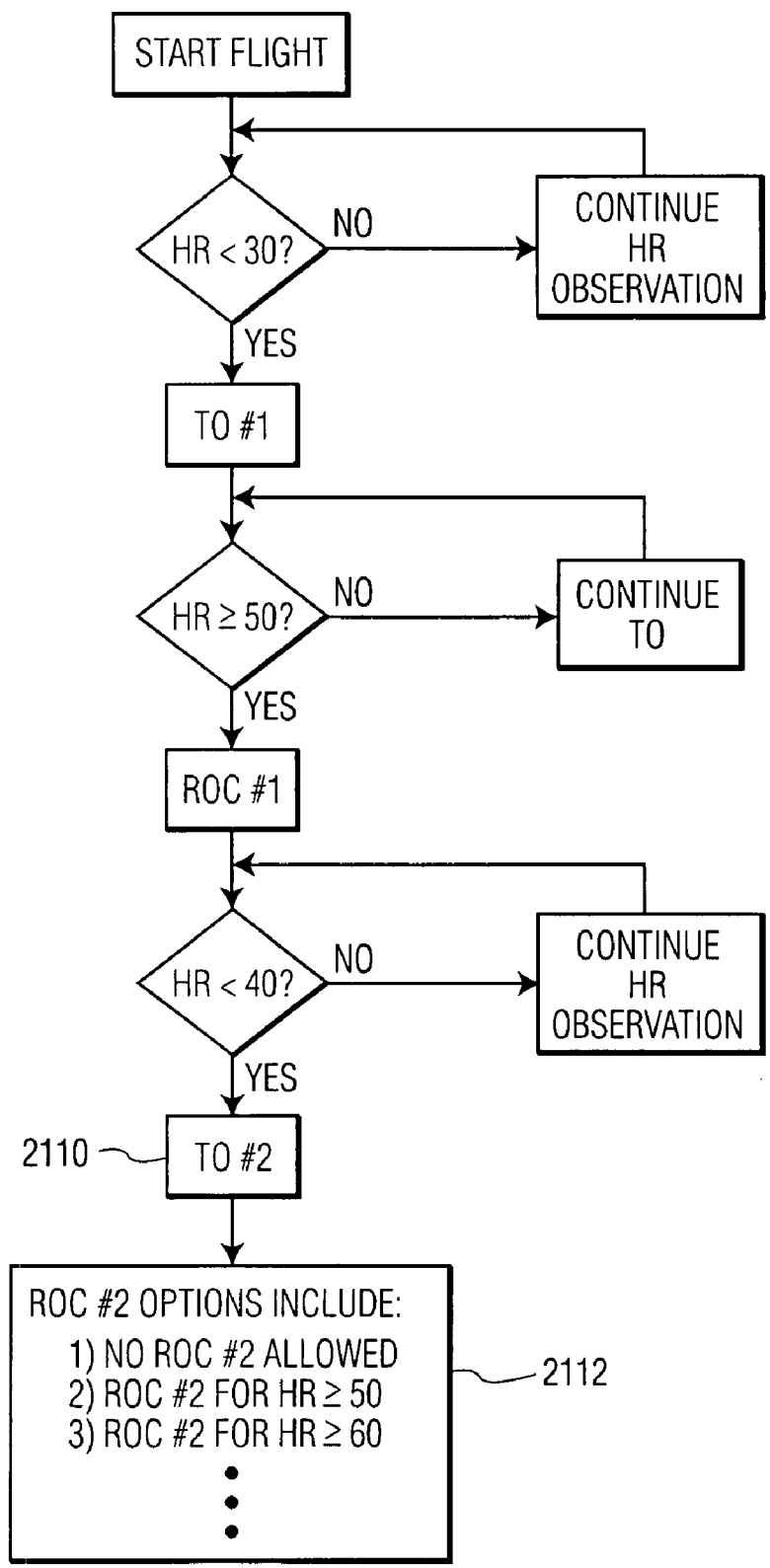
FIG. 14 is a flow diagram showing the possible outcomes after a second TO, in the case of low heart rate.

FIG. 14 illustrates one such situation involving low pilot heart rate. The events leading up to TO #2, block 2110, are essentially the same as those shown in FIG. 11 and discussed in the detailed description associated with that figure. Sample options for ROC #2 are shown in block 2112 [which include options in the category of each of B), C), and D), immediately hereinabove].

Figure 15:
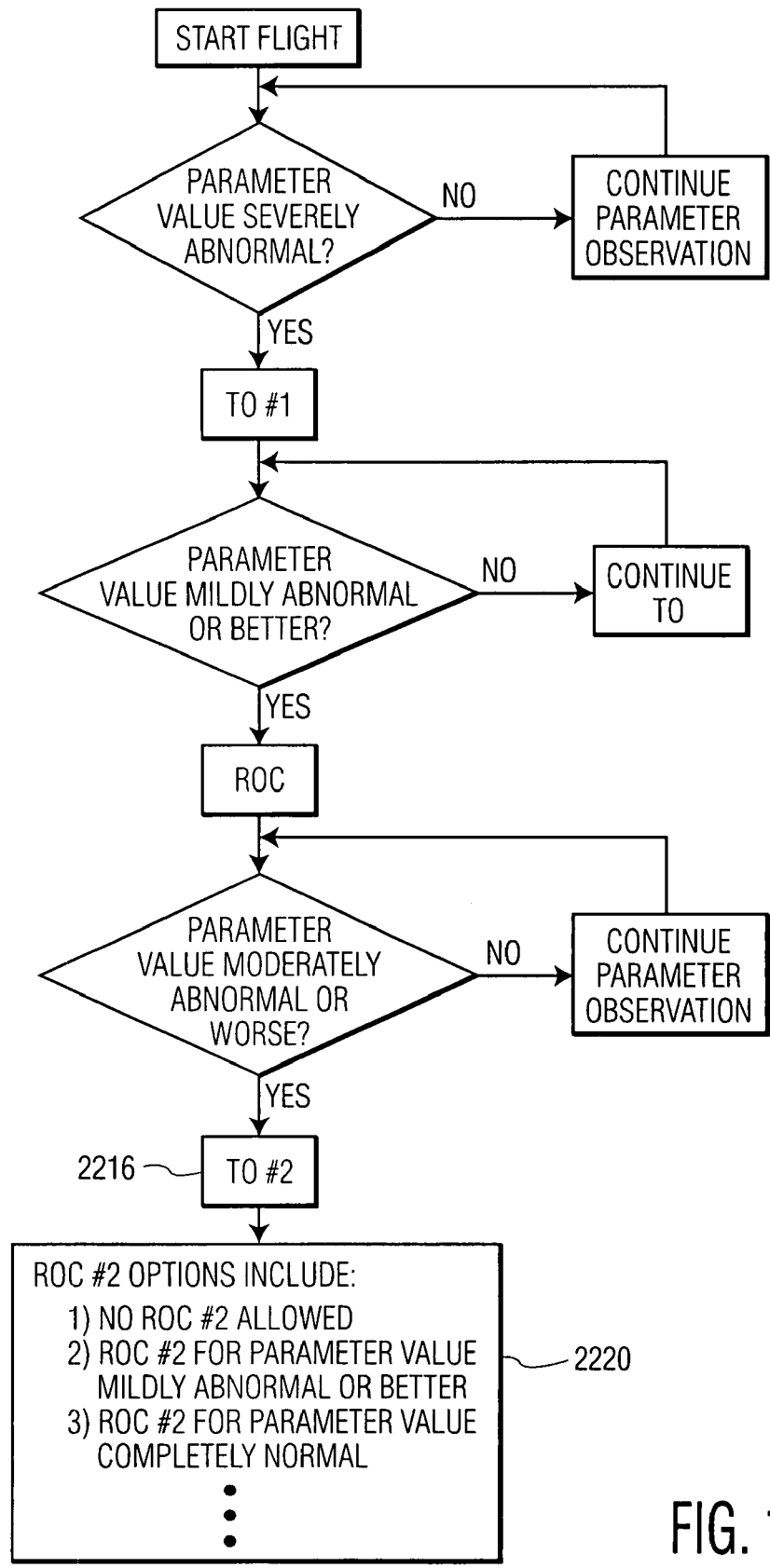
FIG. 15 is a flow diagram showing the possible outcomes after a second TO, in the case of a generalized parameter.

FIG. 15 shows a generalized version of ROC #2 options. It is an extension of FIG. 12, and is identical to that figure up to block 2216. Sample options for ROC #2 are shown in block 2220 [which include options in the category of each of B), C), and D), hereinabove].

Figure 16:
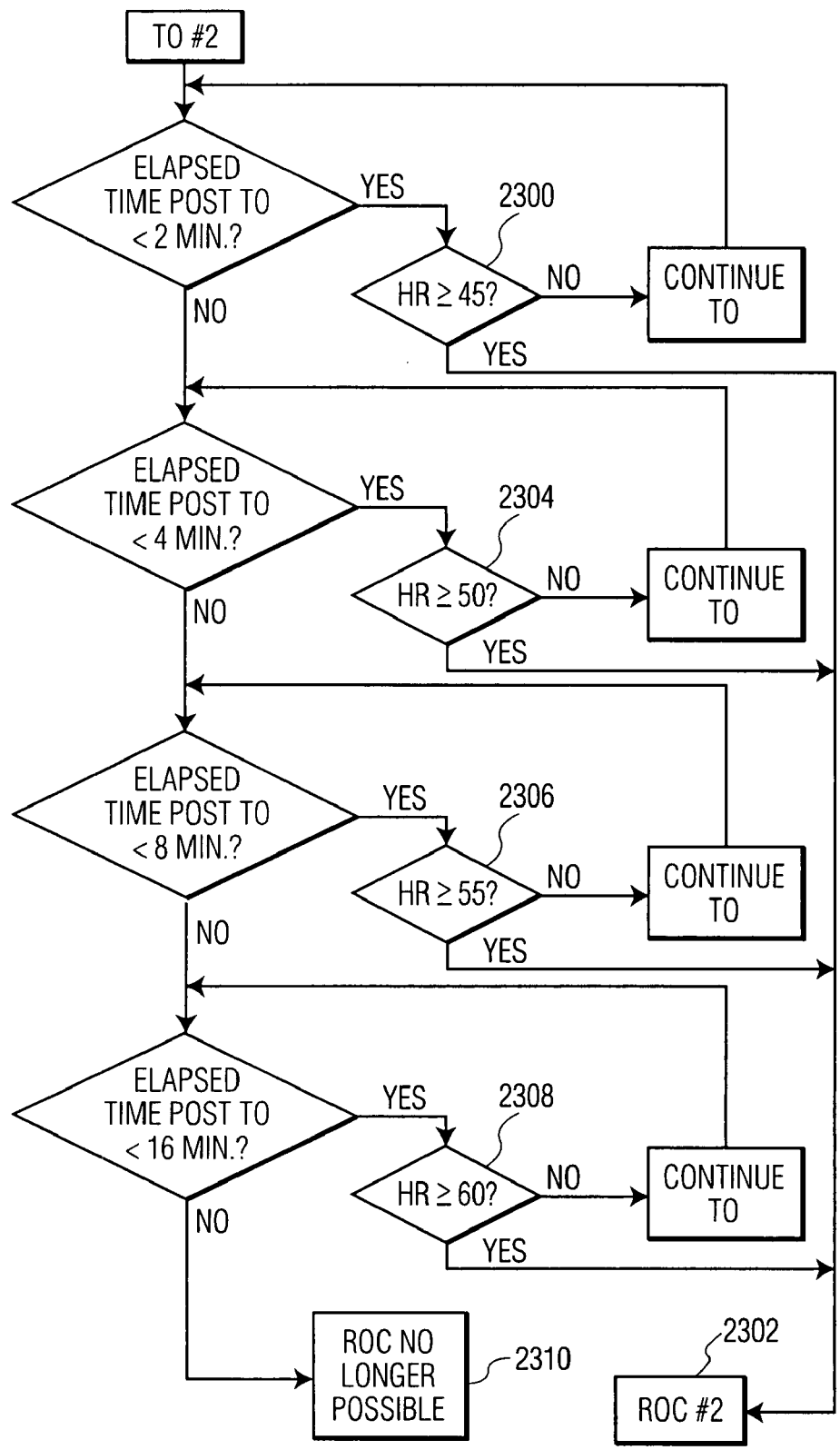

FIG. 16 shows a time-sensitive ROC #2 format for heart rate. It would, by way example, fit with the algorithm shown in FIG. 10 herein, leading up to TO #2 following a decline in heart rate to less than 40. FIG. 16 illustrates time-sensitive hysteresis such that:

A) During the first two minutes, following TO #2, ROC is allowed if the heart rate increases to 45 or more: block 2300 to 2302;
B) During the next two minutes, for ROC to occur, the heart rate must increase to 50 or more: block 2304 to 2302;
C) During the next four minutes, for ROC to occur, the heart rate must increase to 55 or more: block 2306 to 2302; and
D) During the next eight minutes, for ROC to occur, the heart rate must increase to 60 or more: block 2308 to 2302.

Furthermore, it also shows that if the heart rate does not show any of the aforementioned, time-constrained improvements, then 16 minutes after TO #2, ROC is removed from the list of possible events, block 2310.

Embodiments of the invention are possible with any one or more of:

A) more complex ROC #2 arrangements;
B) various probation algorithms for the post ROC #2 period;
C) various algorithms involving TO #3, and/or any subsequent TOs, if applicable; and
D) various algorithms involving ROC, if any, following TO #3. These and numerous other variations, based on the principles presented herein, will be obvious to those skilled in the art.

3. Any of the systems and methods discussed herein with respect to machines in general may be used in conjunction with remotely controlled apparatus, i.e. apparatus in which the operator and apparatus are not located in immediate proximity or contiguity. Any of the systems and methods discussed herein with respect to aircraft in general may be used in conjunction with remotely controlled aircraft, i.e. Unmanned Aerial Vehicles, "UAVs," and Unmanned Air Systems "UASs." Any of the systems and methods discussed herein with respect to ground vehicles in general may be used in conjunction with remotely controlled ground vehicles, i.e. Unmanned Ground Vehicles, "UGVs." Any of the systems and methods discussed herein with respect to watercraft in general may be used in conjunction with remotely controlled watercraft, including Unmanned Underwater Vehicles, "UUVs."

In the case of a remotely controlled aircraft, the fact that the operator is not subject to the extreme stresses of air maneuvering and of life and death combat situations may make cardiac and respiratory monitoring less of a priority; and when the operator of such remotely controlled devices is located so that he may be easily observed by another person, one or more of the cognitive and the physiological monitoring systems may be considered to be unnecessary. Nevertheless, even in the situation of a remotely controlled machine, assessing the operator response to cues and machine warnings could provide an early indication of operator fatigue, which might not be apparent even to another person located in close proximity to the fatigued operator.

There has thus been shown and described a novel method and system for assessing the capability of a person to operate a machine which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for assessing the capability of a first person to operate a machine, and for taking remedial action in response to a lack of such capability, said method comprising the steps of:

(a) repeatedly sensing the value of at least one information parameter for assessing the fitness of said first person to operate said machine, said at least one information parameter being selected from the group of parameters consisting of at least one physiologic information parameter for said first person, at least one information parameter about said first person's operation of said machine and at least one information parameter about at least one action of said first person;

(b) repeatedly calculating a first value as a function of a first of said at least one information parameter;

(c) determining whether said first value is within a first range of values deemed to be acceptable for machine operation by said first person, if said first person were capable of operating said machine;

(d) disabling control of said machine by said first person when said first value is not within said first range of values deemed to be acceptable for machine operation by said first person; and (e) restoring control of said machine by said first person when said first value is within a second range of values deemed to be acceptable for machine operation by said first person;

wherein said second range of values is different from said first range of values, said first value within said second range of values indicating a higher degree of fitness to operate the machine than said first value within said first range of values.

2. The method defined in claim 1, wherein said at least one information parameter includes said at least one physiologic parameter and wherein the first value is a current value of said at least one physiologic information parameter at any given time.

3. The method defined in claim 1, wherein said at least one information parameter includes said at least one physiologic parameter and wherein the first value is an average of values of said at least one physiologic information parameter over a prescribed interval of time.

4. The method defined in claim 1, wherein said at least one information parameter includes said at least one physiologic parameter and wherein the first value is dependent on the rate of change of values of at least one of said physiologic information parameters over a prescribed period of time.

5. The method defined in claim 1, further comprising the steps of calculating a second value as a second function of said at least one information parameter; determining whether said second value is within a third range of values deemed to be acceptable for machine operation by said first person, if said first person were capable of operating said machine; and disabling control of said machine by said first person when at least one of said first value is not within said first range of values deemed to be acceptable for machine operation by said first person and said second value is not within said third range of values deemed to be acceptable for machine operation by said first person.

6. The method defined in claim 5, further comprising the step of restoring control of said machine by said first person when both said first value is within said second range of values deemed to be acceptable for machine operation by said first person, and said second value is within a fourth range of values deemed to be acceptable for machine operation by said first person.

7. The method defined in claim 6, wherein
said fourth range of values is different from said third range of values, said fourth range of values indicating a higher degree of fitness to operate the machine than said third range of values.

8. The method defined in claim 6, wherein said fourth range of values is equal to said third range of values.

9. The method defined in claim 6, wherein at least one of said first and said third range of values is variable in dependence upon at least one of said first and second values.

10. The method defined in claim 5, wherein said second value is a function of an information parameter about at least one action of said first person.

11. The method defined in claim 10, wherein at least one of said action of the first person is a response to a prompt.

12. The method defined in claim 1, wherein said at least one information parameter includes a physiologic information parameter selected from the group consisting of an electroencephalogram information parameter, an electrocardiogram information parameter, a heart rate information parameter, a respiratory rate information parameter, an eye motion information parameter, an eyelid position information parameter, an eyelid motion information parameter, an expired gas mixture information parameter, a blood oxygen content information parameter, a blood oxygen saturation information parameter, and a blood pressure information parameter.

13. The method defined in claim 12, further comprising the steps of calculating a second value as a second function of said at least one physiologic information parameters; determining whether said second value is within a third range of values deemed to be acceptable for machine operation by said first person, if said first person were capable of operating said machine; and disabling control of said machine by said first person when both said first value is not within said first range of values deemed to be acceptable for machine operation by said first person and said second value is not within said third range of values deemed to be acceptable for machine operation by said first person.

14. A method for assessing the capability of a first person to operate a machine, and for taking remedial action in response to a lack of such capability, said method comprising the steps of:
(a) repeatedly sensing the value of at least one information parameter for assessing the fitness of said first person to operate said machine, said at least one information parameter being selected from the group of parameters consisting of at least one physiologic information parameter for said first person, at least one information parameter about said first person's operation of said machine and at least one information parameter about at least one action of said first person;
(b) repeatedly calculating a first value as a function of said at least one information parameter;
(c) determining whether the first value is within a first range of values deemed to be acceptable for machine operation by said first person, if said first person were capable of operating said machine;
(d) disabling control of said machine by said first person when said first value is not within said first range of values deemed to be acceptable for machine operation by said first person for a first duration of time; and
(e) restoring control of said machine by said first person when said first value is within said first range of values deemed to be acceptable for machine operation by said first person for a second duration of time, wherein said second duration exceeds said first duration.

15. The method defined in claim 14, wherein at least one of said information parameters is a physiologic information parameter and said first value is an average of values of said physiologic parameter over a prescribed period of time.

16. A method for assessing the capability of a first person to operate a machine, and for taking remedial action in response to a lack of such capability, said method comprising the steps of:
(a) repeatedly sensing the value of at least one information parameter for assessing the fitness of said first person to operate said machine, said at least one information parameter being selected from the group of parameters consisting of at least one physiologic information parameter for said first person, at least one information parameter about said first person's operation of said machine and at least one information parameter about at least one action of said first person;
(b) repeatedly calculating a first value as a function of said at least one information parameter;
(c) determining whether the first value is within a first range of values deemed to be acceptable for machine operation by said first person, if said first person were capable of operating said machine;
(d) disabling control of said machine by said first person, for the first time, when said first value is not within said first range of values deemed to be acceptable for machine operation by said first person;
(e) restoring control of said machine by said first person when said first value is within a second range of values deemed to be acceptable for machine operation by said first person; and
(f) disabling control of said machine by said first person, after the first time, when said first value is not within a third range of values deemed to be acceptable for machine operation by said first person, wherein said third range of values corresponds to a greater degree of first person fitness to operate said machine than the first person fitness corresponding to said first range of values.

17. A method for assessing the capability of a first person to operate a machine, and for taking remedial action in response to a lack of such capability, said method comprising the steps of:

(a) repeatedly sensing the value of at least one information parameter for assessing the fitness of said first person to operate said machine, said at least one information parameter being selected from the group of parameters consisting of at least one physiologic information parameter for said first person, at least one information parameter about said first person's operation of said machine and at least one information parameter about at least one action of said first person;

(b) repeatedly calculating a first value as a function of said at least one information parameter;

(c) determining whether the first value is within a first range of values deemed to be acceptable for machine operation by said first person, if said first person were capable of operating said machine;

(d) disabling control of said machine by said first person, for the first time, when said first value is not within said first range of values deemed to be acceptable for machine operation by said first person for a first duration of time;

(e) restoring control of said machine to said first person when said first value is within said first range of values deemed to be acceptable for machine operation by said first' person, for a second duration of time; and (f) disabling control of said machine by said first person, after the first time, when said first value is not within said first range of values deemed to be acceptable for machine operation by said first person, for a third duration of time, wherein said third duration corresponds to a greater degree of first person fitness to operate said machine than the first person fitness corresponding to said first duration.

18. The method defined in claim 17, wherein said second duration equals said first duration.

19. The method defined in claim 17, wherein said first duration exceeds said third duration.

20. A method for assessing the capability of a first person to operate a machine, and for taking remedial action in response to a lack of such capability, said method comprising the steps of:

(a) repeatedly sensing the value of at least one information parameter for assessing the fitness of said first person to operate said machine, said at least one information parameter being selected from the group of parameters consisting of at least one physiologic information parameter for said first person, at least one information parameter about said first person's operation of said machine and at least one information parameter about at least one action of said first person;

(b) repeatedly calculating a first value as a function of said at least one information parameter;

(c) determining whether the first value is within a first range of values deemed to be acceptable for machine operation by said first person, if said first person were capable of operating said machine;

(d) disabling control of said machine by said first person, for the first time, when said first value is not within said first range of values deemed to be acceptable for machine operation by said first person;

(e) determining whether the first value is within a second range of values deemed to be acceptable for machine operation by said first person, if said first person were capable of operating said machine, wherein said second range of values corresponds to a greater degree of first person fitness to operate said machine than the first person fitness corresponding to said first range of values;

(f) restoring control of said machine by said first person when said first value is within said second range of values; and (g) disabling control of said machine by said first person, after the first time, when said first value is not within a third range of values deemed to be acceptable for machine operation by said first person, wherein said third range of values corresponds to a greater degree of first person fitness to operate said machine than the first person fitness corresponding to said first range of values and said third range of values corresponds to a lesser degree of first person fitness to operate said machine than the first person fitness corresponding to said second range of values.

* * * * *